(12) United States Patent
Goto et al.

(10) Patent No.: US 8,529,006 B2
(45) Date of Patent: Sep. 10, 2013

(54) IMAGE PROCESSOR AND IMAGE PROCESSING METHOD

(75) Inventors: Fumihiro Goto, Kawasaki (JP);
Akitoshi Yamada, Yokohama (JP);
Akihiko Nakatani, Kawasaki (JP);
Mitsuhiro Ono, Tokyo (JP); Fumitaka Goto, Tokyo (JP); Okinori Tsuchiya, Yokohama (JP); Takashi Fujita, Kawasaki (JP); Rie Kajihara, Minoo (JP); Ayumi Sano, Kawasaki (JP);
Tomokazu Ishikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 408 days.

(21) Appl. No.: 12/938,707

(22) Filed: Nov. 3, 2010

(65) Prior Publication Data
US 2011/0122178 A1    May 26, 2011

(30) Foreign Application Priority Data
Nov. 20, 2009    (JP) .................................. 2009-265346

(51) Int. Cl.
*B41J 29/38* (2006.01)

(52) U.S. Cl.
USPC ......................................................... 347/14

(58) Field of Classification Search
USPC ............................................................ 347/14
See application file for complete search history.

(56) References Cited

U.S. PATENT DOCUMENTS

| 6,267,467 B1 * | 7/2001 | Otsuki ............................ 347/43 |
| 6,511,146 B2 | 1/2003 | Ishikawa et al. |
| 2005/0001866 A1 * | 1/2005 | Eguchi et al. ................... 347/15 |

FOREIGN PATENT DOCUMENTS

| JP | 2000-103088 A | 4/2000 |
| JP | 2008-162151 A | 7/2008 |

* cited by examiner

*Primary Examiner* — Laura Martin
(74) *Attorney, Agent, or Firm* — Fitzpatrick, Cella, Harper & Scinto

(57) ABSTRACT

Provided are an image processor and an image processing method that are capable of suppressing both density unevenness due to printing position shifts among a group of dots printed by a plurality of relative movements (or a plurality of printing element groups) and graininess. In order to accomplish this, a dot overlap rate in the printing mode in which the density unevenness stands out is made higher than the dot overlap rate in the printing mode in which other defects stand out more than the density unevenness. By doing so, it is possible to suitably adjust the dot overlap rate according to the image characteristic, and output an image having no density unevenness or graininess.

20 Claims, 18 Drawing Sheets

| | TOTAL NUMBER OF DOTS | NUMBER OF OVERLAPPING DOTS | DOT OVERLAP RATE (%) |
|---|---|---|---|
| (A) | 8 | 0 | 0 (=0÷8×100) |
| (B) | 8 | 2 | 25 (=2÷8×100) |
| (C) | 8 | 4 | 50 (=4÷8×100) |
| (D) | 8 | 6 | 75 (=6÷8×100) |
| (E) | 8 | 8 | 100 (=8÷8×100) |
| (F) | 7 | 6 | 86 (=6÷7×100) |
| (G) | 6 | 2 | 33 (=2÷6×100) |

FIG.4H

DIFFUSION MATRIX A

|   | ● | 9 | 3 |
|---|---|---|---|
| 5 | 9 | 3 |   |
|   | 3 |   |   |

●PIXEL BEING PROCESSED

FIG.9A

DIFFUSION MATRIX B

|   |   | ● | 2 | 1 |
|---|---|---|---|---|
| 1 | 1 | 2 | 1 |   |

●PIXEL BEING PROCESSED

FIG.9B

IMAGE PROCESSOR AND IMAGE PROCESSING METHOD

BACKGROUND OF THE INVENTION

1. Field of the Invention

The present invention relates to an image processor and image processing method that process multi-value image data that corresponds to the same area in order to print an image in the same area by relatively moving a printing unit a plurality of times or by relatively moving a plurality of printing element groups with respect to the same area of the printing medium.

2. Description of the Related Art

In inkjet printing apparatuses, a multipass printing method that completes an image in the same area of a printing medium by performing a plurality of printing scans by a printing head over that same area is a technique for reducing density unevenness and stripes in the printed image. However, even by adopting the multipass printing method, deviation of the dot printing position may occur between that of a prior printing scan and that of a later printing scan due to fluctuation in the amount the printing medium is conveyed. This kind of deviation causes fluctuation in the dot coverage rate, which causes defects in the image such as density fluctuation and density unevenness.

This method is a technique for reducing these kinds of image defects, in which image data are divided into divisions that correspond to different printing scans in the stage of the multi-value image data before binarization, and then each of the multi-value image data after the division is binarized independently (with no correlation) (see Japanese Patent Laid-open No. 2000-103088). FIG. 10A is a diagram that illustrates the state of the arrangement of dots that are printed based on image data that were processed by the method disclosed in Japanese Patent Laid-open No. 2000-103088. In the diagram, the black dots 1501 are dots that are printed in the first printing scan, the white dots 1502 are dots that are printed in the second printing scan, and the gray dots 1503 are overlapping dots that are printed in the first printing scan and second printing scan.

With this kind of dot arrangement, even though the dot group that is printed in the first printing scan and the dot group that is printed in the second printing scan shift in the main scanning direction or sub scanning direction, the dot coverage rate with respect to the printing medium does not fluctuate much. The reason for that is that areas where dots that are printed in the first printing scan and dots that are printed in the second printing scan overlap newly appear, however, there are also areas that exist where two dots that were originally to be printed such that they overlap no longer overlap.

However, in the method disclosed in Japanese Patent Laid-open No. 2000-103088, binary data are not correlated among a plurality of planes, so graininess may become worse. For example, from the aspect of reducing graininess, the ideal in highlighted areas would be to evenly disperse the dots while maintaining a set distance between a few dots. However, in a configuration in which binary data are not correlated among a plurality of planes, the locations of overlapping dots (1603) and locations of dots printed adjacent to each other (1601, 1602) occur irregularly as illustrated in FIG. 10C, and an accumulation of these dots cause the graininess to become worse. In other words, when the dispersion of the dots is increased in order to suppress the graininess (keep the dot overlap rate low), unevenness occurs as the density changes, and when the dot overlap rate is increased in order to suppress the unevenness due to this density change, the graininess becomes worse.

Therefore, the inventors diligently studied a method for solving both of these two problems simultaneously, and as a result gained the following knowledge. In other words, both the density change and graininess described above respectively have certain allowable ranges (ranges in which they are hardly noticeable by human perception). Therefore, by controlling the dot overlap rate so as to keep both within the respective allowable ranges, output of an image in which defects do not stand out can be expected. More specifically, the allowable ranges described above change depending on the type of a printing medium, the type of image (whether the image is text or a photograph), or image quality required for a mode a user has set, and the suitable dot overlap rate is not necessarily always constant. Therefore, preferably, in a system in which a plurality of printing modes respectively having different printing speeds or multipass numbers depending on various conditions are prepared, the dot overlap rate is adjusted according to the various conditions shown above.

SUMMARY OF THE INVENTION

The present invention is made in consideration of the knowledge described above, and the objective is to suppress both unevenness due to changes in density (unevenness due to density fluctuation) and graininess.

The first aspect of the present invention is an image processor for processing input image data that corresponds to a pixel area on a printing medium in order to perform printing in the pixel area by a plurality of relative movements between a printing unit configured to print a dot and the printing medium, the image processor comprising: a setting unit configured to set a printing mode that is selected from a plurality of printing modes including a first printing mode and a second printing mode having a larger number of the relative movements than the first printing mode; and an image processing unit configured to, according to the printing mode set by the setting unit, generate a plurality of density data corresponding to the plurality of relative movements from the input image data, and quantize each of the plurality of density data to generate quantized data, wherein in at least a predetermined density area, a ratio in the first printing mode is higher than the ratio in the second printing mode, the ratio being a ratio of a number of dots that are to overlap and be printed at the same position in the pixel area by the plurality of relative movements on the basis of the quantized data with respect to the total number of dots that are to be printed in the pixel area by the plurality of relative movements on the basis of the quantized data.

The second aspect of the present invention is an image processor for processing input image data that corresponds to a pixel area on a printing medium in order to perform printing in the pixel area by a plurality of relative movements between a printing unit configured to print a dot and the printing medium, the image processor comprising: a setting unit configured to set a printing mode that is selected from a plurality of printing modes including a first printing mode for performing printing on a first type of printing medium and a second printing mode for performing printing on a printing medium having lower ink absorbability than the first type of printing medium; and an image processing unit configured to, according to the printing mode set by the setting unit, generate a plurality of density data corresponding to the plurality of relative movements from the input image data, and quantize each of the plurality of density data to generate quantized data, wherein in at least a predetermined density area, a ratio in the first printing mode is higher than the ratio in the second printing mode, the ratio being a ratio of a number of dots that are to overlap and be printed at the same position in the pixel area by the plurality of relative movements on the basis of the quantized data with respect to the total number of dots that are to be printed in the pixel area by the plurality of relative movements on the basis of the quantized data.

The third aspect of the present invention is an image processor for processing input image data that corresponds to a pixel area on a printing medium in order to perform printing in the pixel area by relative movements between a plurality of printing element groups for printing dots of the same color and the printing medium, the image processor comprising: a setting unit configured to set a printing mode that is selected from a plurality of printing modes including a first printing mode and a second printing mode having a larger number of the relative movements than the first printing mode; and an image processing unit configured to, according to the printing mode set by the setting unit, generate a plurality of density data corresponding to the plurality of printing element groups from the input image data, and quantize each of the plurality of density data to generate quantized data, wherein in at least a predetermined density area, the ratio in the first printing mode is higher than the ratio in the second printing mode, the ratio being the ratio of a number of dots that are to overlap and be printed at the same position in the pixel area by the plurality of printing element groups on the basis of the quantized data with respect to the total number of dots that are to be printed in the pixel area by the plurality of printing element groups on the basis of the quantized data.

The fourth aspect of the present invention is an image processing method for processing input image data that corresponds to a pixel area on a printing medium in order to perform printing in the pixel area by a plurality of relative movements between a printing unit configured to print a dot and the printing medium, the image processing method comprising: a setting step of setting a printing mode that is selected from a plurality of printing modes including a first printing mode and a second printing mode having a larger number of the relative movements than the first printing mode; and an image processing step of, according to the printing mode set by the setting step, generating a plurality of density data corresponding to the plurality of relative movements from the input image data, and quantizing each of the plurality of density data to generate quantized data, wherein in at least a predetermined density area, the ratio in the first printing mode is higher than the ratio in the second printing mode, the ratio being a ratio of a number of dots that are to overlap and be printed at the same position in the pixel area by the plurality of relative movements on the basis of the quantized data with respect to the total number of dots that are to be printed in the pixel area by the plurality of relative movements on the basis of the quantized data.

The fifth aspect of the present invention is an image processing method for processing input image data that corresponds to a pixel area on a printing medium in order to perform printing in the pixel area by a plurality of relative movements between the printing unit configured to print a dot and the printing medium, the image processing method comprising: a setting step of setting a printing mode that is selected from a plurality of printing modes including a first printing mode for performing printing on a first type of printing medium and a second printing mode for performing printing on a printing medium having lower ink absorbability than the first type of printing medium; and an image processing step of, according to the printing mode set in the setting step, generating a plurality of density data corresponding to the plurality of relative movements from the input image data, and quantizing each of the plurality of density data to generate quantized data, wherein in at least a predetermined density area, the ratio in the first printing mode is higher than the ratio in the second printing mode, the ratio being a ratio of a number of dots that are to overlap and be printed at the same position in the pixel area by the plurality of relative movements on the basis of the quantized data with respect to the total number of dots that are to be printed in the pixel area by the plurality of relative movements on the basis of the quantized data.

Further features of the present invention will become apparent from the following description of exemplary embodiments (with reference to the attached drawings).

BRIEF DESCRIPTION OF THE DRAWINGS

FIGS. 4A to 4H are diagrams for explaining the dot overlap rate;

FIGS. 9A and 9B are diagrams that illustrate an example of an error-diffusion matrix that is used in quantization processing;

DESCRIPTION OF THE EMBODIMENTS

The embodiments explained below use an inkjet printing apparatus as an example, however; the present invention is not limited to the inkjet printing apparatus. The present invention can be applied to any device other than the inkjet printing apparatus as long as the device employs a method in which an image is printed on a printing medium by a printing unit for printing dots during relative movement between the printing unit and the printing medium.

Also, the "relative movement (or relative scanning)" between the printing unit and the printing medium refers to an operation of moving (scanning) the printing unit relative to the printing medium, or an operation of moving (conveying) the printing medium relative to the printing unit. In addition, the printing unit refers to one or more printing element groups (nozzle arrays), or one or more printing heads.

Figure 7:
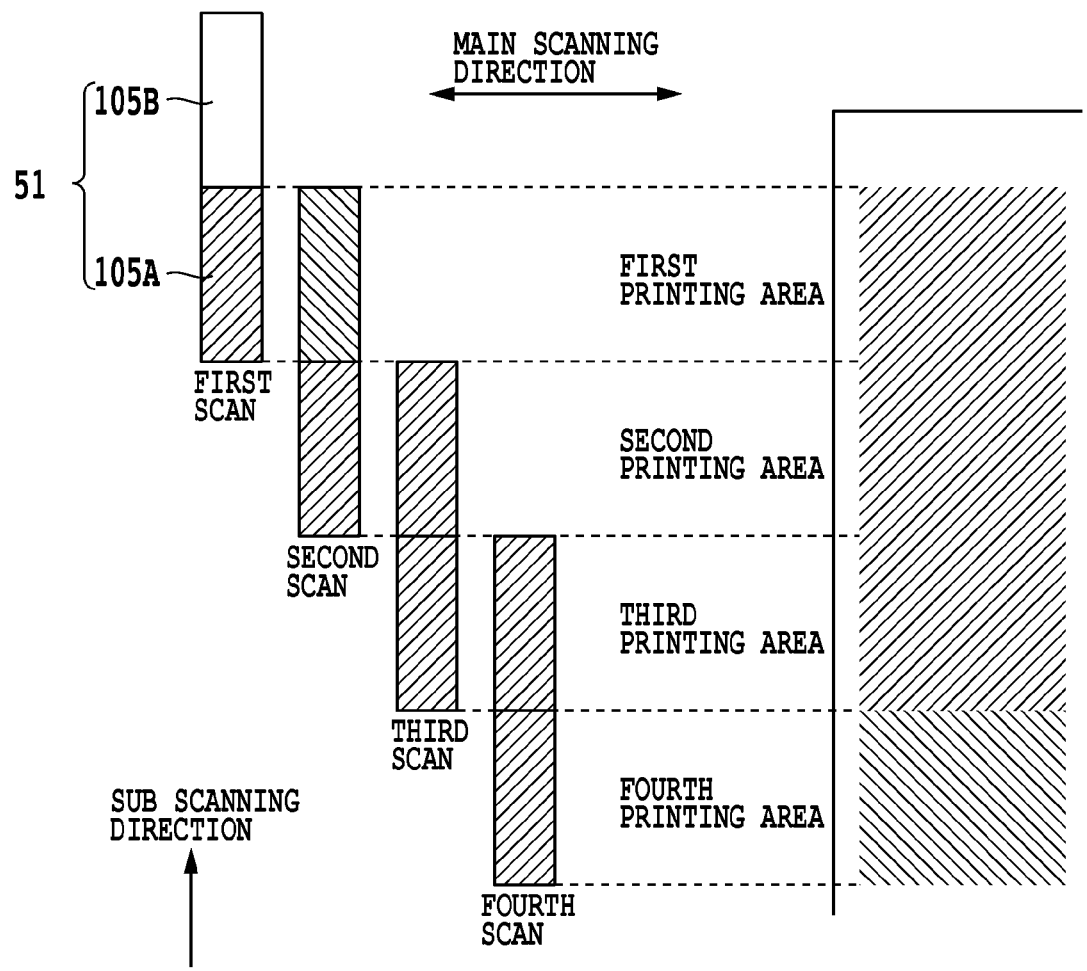
FIG. 7 is a diagram illustrating the state of 2-pass multipass printing.

In the image processor explained below, data processing is performed in order to print an image in the same area on a printing medium (specified area) by relatively moving a printing unit a plurality of times or relatively moving a plurality of printing element groups with respect to the same area on the printing medium. Here, the "same area (specified area)" refers to "one pixel area" on a micro scale, and to a "printable area by one relative movement" on a macro scale. A "pixel area (sometimes simply referred to as a "pixel")" refers to the smallest unit of area for which gradation expression is possible using multi-value image data. On the other hand, the "printable area by one relative movement" refers to an area on the printing medium over which the printing unit passes during one relative movement, or to an area smaller than this area (for example, one raster area). For example, in the case of executing a multipass mode as illustrated in FIG. 7, on a macro scale it is also possible to define one printing area in the diagram as the same area.

<Basic Explanation of Print Apparatus>

Figure 1A:
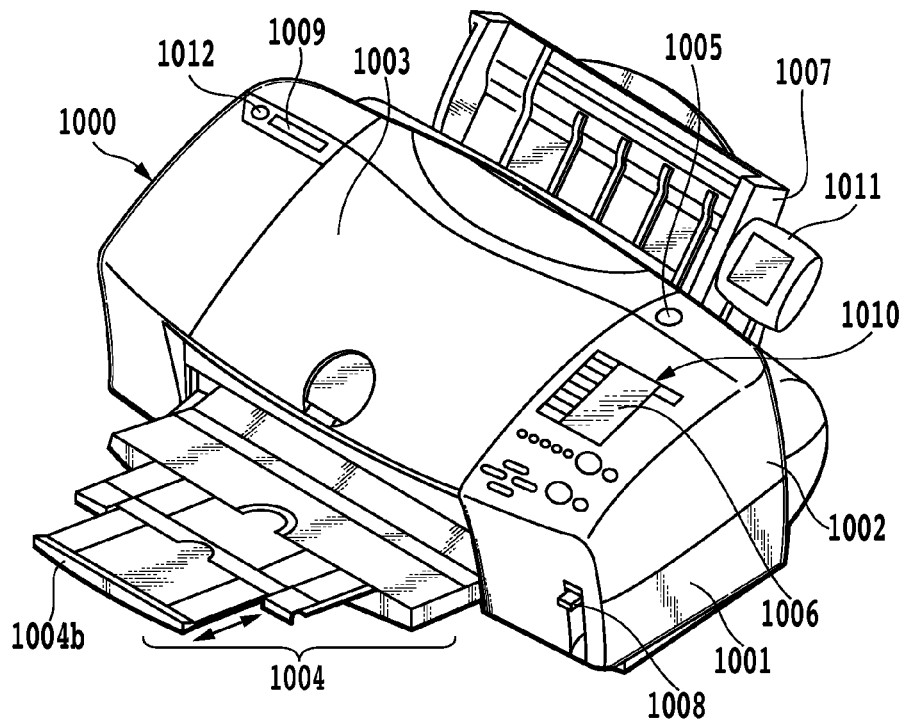
FIGS. 1A and 1B are diagrams illustrating the basic construction of an applicable printer in the present invention.

FIG. 1A is a schematic perspective diagram of a photodirect printer (hereinafter referred to as a PD printer) 1000 that functions as the image processor of the present invention. The PD printer 1000 has many functions: receiving data from a host computer (PC) and printing, directly reading and printing an image that is stored in a memory medium such as a memory card, and receiving from a digital camera an image and printing it, PDA, or the like.

In the diagram, Reference number 1004 is a discharge tray in which printed paper can be stacked, and Reference number 1003 is an access cover that can be opened and closed by the user when replacing a printing head cartridge, ink tank, or the like that is housed in the main unit. Menu items for setting various conditions related to printing (for example, the type of printing medium, image quality, etc.) are displayed on an operating panel 1010 that is provided on an upper case 1002, and the user can set these items according to the type of image or the use of the image to be outputted. Even in the case of image data inputted from any supply source, the user can use the operating panel 1010 to set the type of printing medium to be used for printing, and printing quality such as "fast", "standard", or "fine". Then, depending on the setting, the printing mode that is performed by the printer engine 3004 is set. However, such a setting of the printing mode may not be necessarily performed by the user through the operating panel. For example, a configuration may be employed in which the user makes the setting through a printer driver on PC 3010, or a control unit 3000 automatically makes the setting by searching the image in the digital camera 3012 or PC card 3011.

Reference number 1007 is an automatic feed unit that automatically feeds a printing medium into the main unit, Reference number 1009 is a card slot into which a removable memory card adapter is inserted, and Reference number 1012 is a USB terminal for connecting a digital camera. A USB connector for connecting the PC is provided on the rear surface of the PD printer 1000.

<Electrical Specifications of Control Unit>

Figure 2:
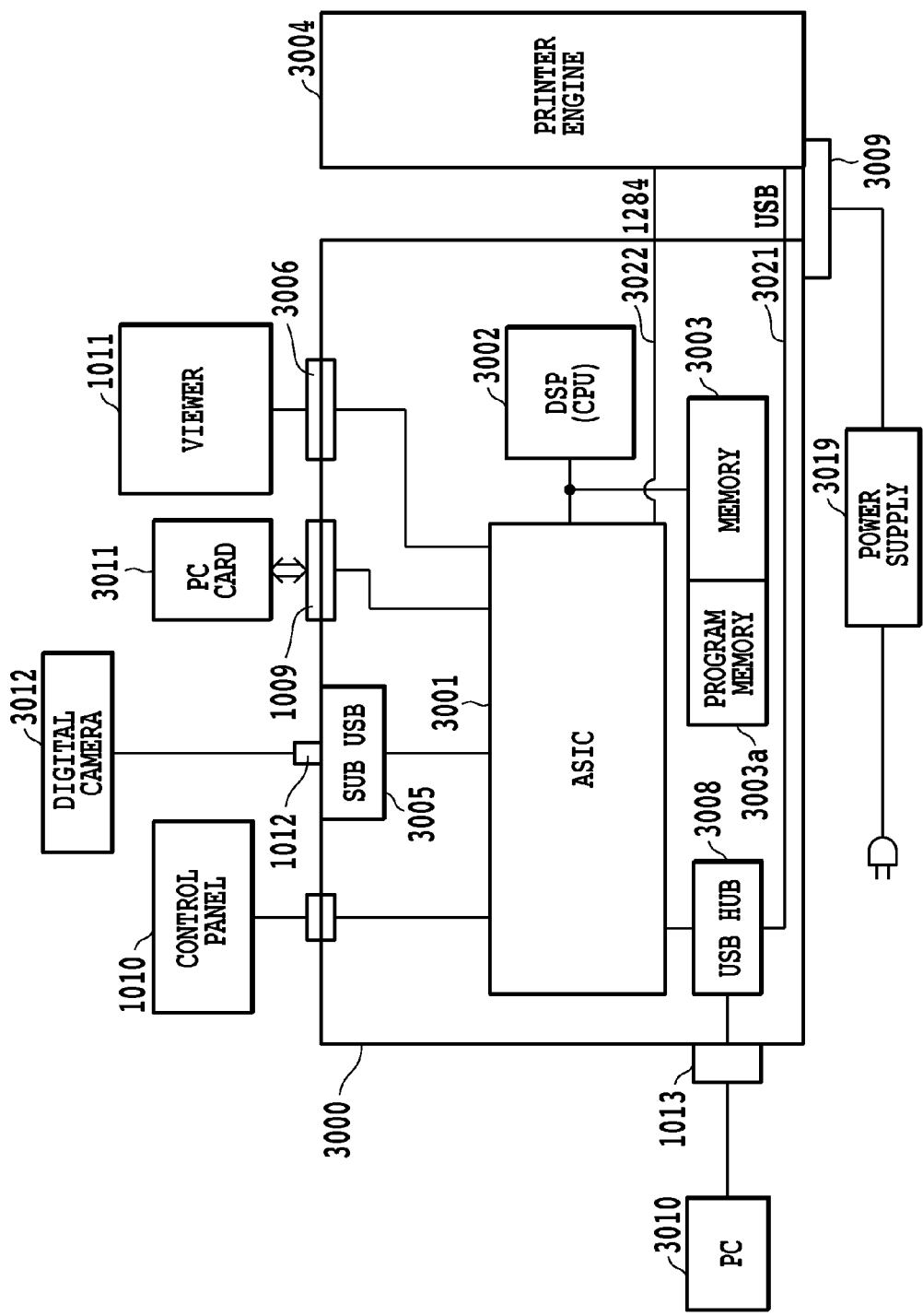
FIG. 2 is a block diagram illustrating the configuration of control of the printer in FIGS. 1A and 1B.

FIG. 2 is a block diagram illustrating the construction of the major parts related to the control of the PD printer 1000 according to the embodiments of the present invention. In the diagram, Reference number 3000 is the control unit (control board), and 3001 is an image processing ASIC (special customized LSI). Reference number 3002 is a DSP (digital signal processor) having an internal CPU and is in charge of various kinds of control processing and various kinds of image processing that will be described later. Reference number 3003 is a memory and has a program memory 3003a that stores a control program for the CPU of the DSP 3002, a RAM area that stores a program used during execution, and a memory area that functions as a work memory that stores image data and the like. Reference number 3004 is the printer engine, and here the printer engine is for an inkjet printing apparatus that prints color images using color inks. Reference number 3005 is a USB connector that functions as a port for connecting the digital camera (DSC) 3012. Reference number 3006 is a connector for connecting a viewer 1011. Reference number 3008 is a USB hub (USB HUB), and when the PD printer 1000 performs printing based on image data from the PC 3010, it allows the data from the PC 3010 to pass through as is, and outputs the data to the printer engine 3004 via a USB 3021. By doing so, the connected PC 3010 is able to perform printing by directly exchanging data and signals with the printer engine 3004 (functions as a normal PC printer). Reference number 3009 is a power-supply connector and input with DC voltage from a power supply 3019 that has been converted from commercial AC voltage. The PC 3010 is a normal personal computer, reference number 3011 is the memory card (PC card) described above, and 3012 is the digital camera (DSC). Note that the exchange of signals between this control unit 3000 and the printer engine 3004 is performed via the USB 3021 described above or an IEEE 1284 bus 3022.

<Summary of the Printing Section>

Figure 1B:
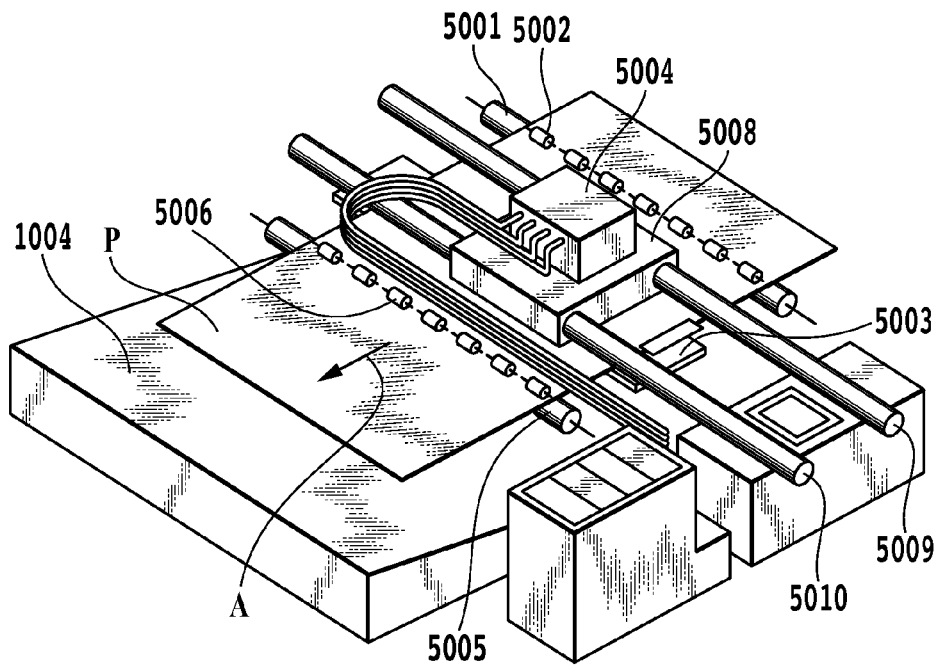

FIG. 1B is a perspective diagram illustrating an outline of the printing section of the printer engine unit of the serial inkjet printing apparatus according to the embodiments of the present invention. A printing medium P is fed by an automatic feed unit 1007 to nip sections between a conveying roller 5001 that is located on a conveying path and pinch rollers 5002 that follow the conveying roller 5001. After that, the printing medium P is conveyed in the direction indicated by the arrow A in the diagram (sub scanning direction) by rotation of the conveying roller 5001 while being guided and supported on a platen 5003. The pinch rollers 5002 are elastically biased against the conveying roller 5001 by a pressure unit such as an unillustrated spring. The conveying roller 5001 and pinch rollers 5002 are component elements of the first conveying unit that is present on the upstream side in the conveying direction of the printing medium.

The platen 5003 is provided in a printing position that faces the surface (ejection face) of an inkjet-type printing head 5004 where ejection ports are formed, and by supporting the back surface of the printing medium P, maintains a fixed distance between the front surface of the printing medium P and the ejection surface. The printing medium P that has been conveyed over the platen 5003 and subjected to printing is held between a rotating discharge roller 5005 and spurs 5006 that are rotating bodies following the discharge roller 5005, conveyed in the A direction, and discharged from the platen 5003 to a discharge tray 1004. The discharge roller 5005 and spurs 5006 are component elements of a second conveying unit that is present on the downstream side in the conveying direction of the printing medium.

The removable printing head 5004 is mounted on a carriage 5008 positioned such that the ejection face thereof faces the platen 5003 or printing medium P. The carriage 5008 is moved back and forth along two guide rails 5009 and 5010 by the driving force of a carriage motor E0001, and during the moving process, the printing head 5004 performs the operation of discharging ink according to the printing signal. The direction that the carriage 5008 moves in is a direction orthogonal to the direction the printing medium is conveyed in (direction indicated by the arrow A), and called the main scanning direction. On the other hand, the direction the printing medium is conveyed in is called the sub scanning direction. By alternately repeating the main scanning by the carriage 5008 and the printing head 5004 and the conveying (sub scanning) of the printing medium, printing is performed on the printing medium A.

Figure 15:
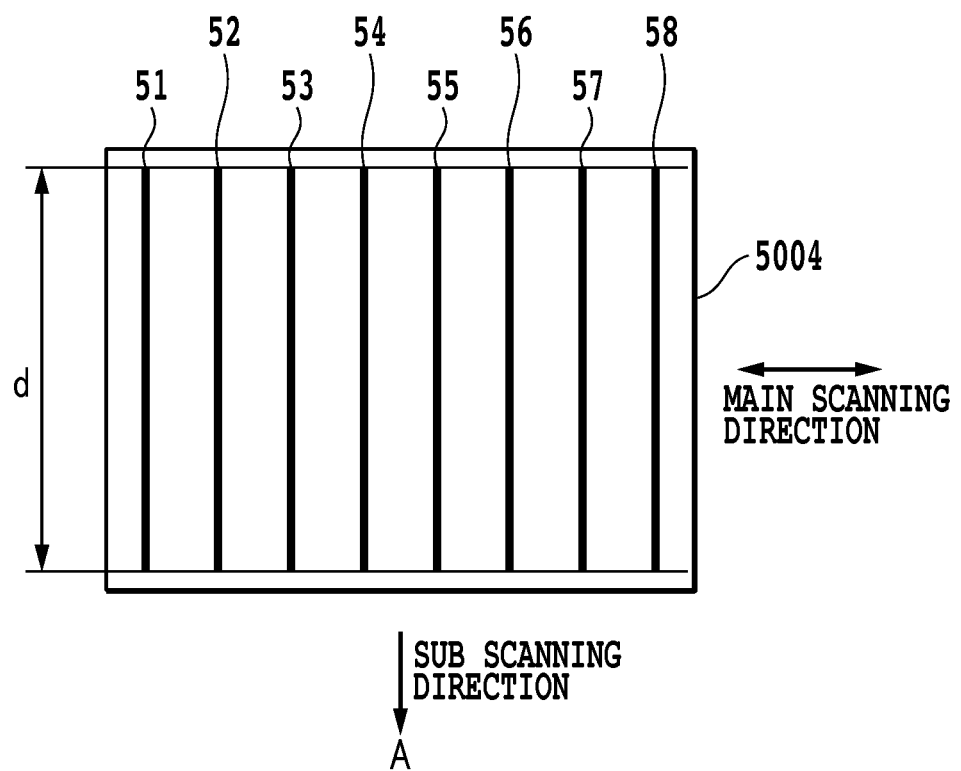
FIG. 15 is a schematic diagram of a printing head when observed from the surface where ejection ports are formed.

FIG. 15 is a schematic diagram of the printing head 5004 as observed from the surface where the ejection ports are formed. In the diagram, Reference numbers 51 and 58 are first and second cyan nozzle arrays (printing element groups), and 52 and 57 are first and second magenta nozzle arrays. In addition, Reference numbers 53 and 56 are first and second yellow nozzle arrays, and 54 and 55 are first and second black nozzle arrays. A width of each of the nozzle arrays in the sub scanning direction is d, and printing having the width d is possible in one scan. The printing head 5004 of the present embodiment is provided with two nozzle arrays that discharge nearly the same amount of ink and print dots having nearly the same size, for each of the colors, i.e., cyan (C), magenta (M), yellow (Y), and black (K), and performs printing on a printing medium using both nozzle arrays. By doing so, it is possible to reduce by approximately ½ the density unevenness and stripes that occur due to the variation between the individual nozzles.

Further, the print apparatus of the present embodiment performs multipass printing, so that an image is gradually formed by performing a plurality of printing scans with respect to the area that can be printed in one printing scan by the printing head 5004. At this time, by performing the conveying operation by a distance that is less than the width d of the printing head 5004 between each of the printing scans, it is possible to further reduce the density unevenness and stripes caused by the variation between the individual nozzles. FIG. 7 is a diagram that schematically illustrates the printing state of 2-pass printing, and illustrates the relative positional relationship between the printing head 5004 and the printing area when printing from the first printing area to the fourth printing area that correspond to the same four areas. Whether or not to perform multipass printing, or a multipass number (the number of printing scans over the same area) is determined according to information that is inputted by the user from the operating panel 1010, or image information that is received from the host device.

<Relationship Among Control of Dot Overlap Rate, Density Unevenness, and Graininess or Density Shortage>

Figure 10A:
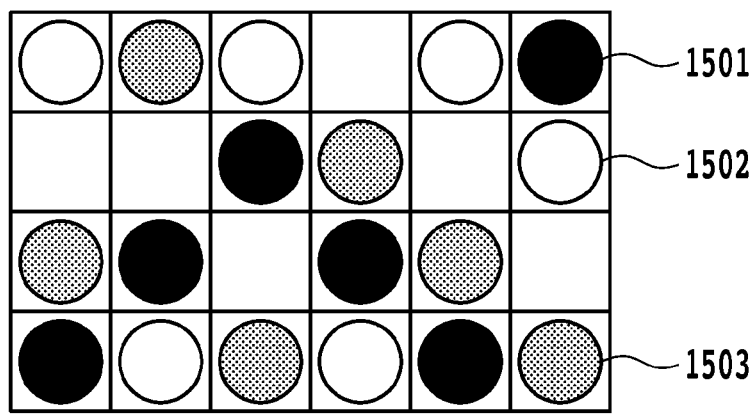
FIGS. 10A to 10C are diagrams for explaining the relationship between dot arrangement and graininess.
Figure 10B:
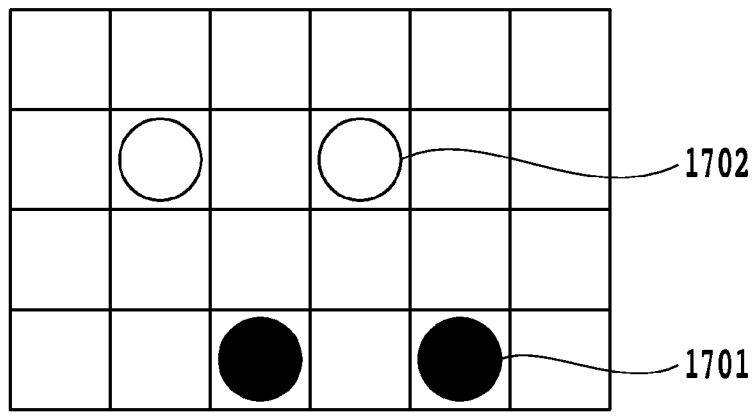
Figure 10C:
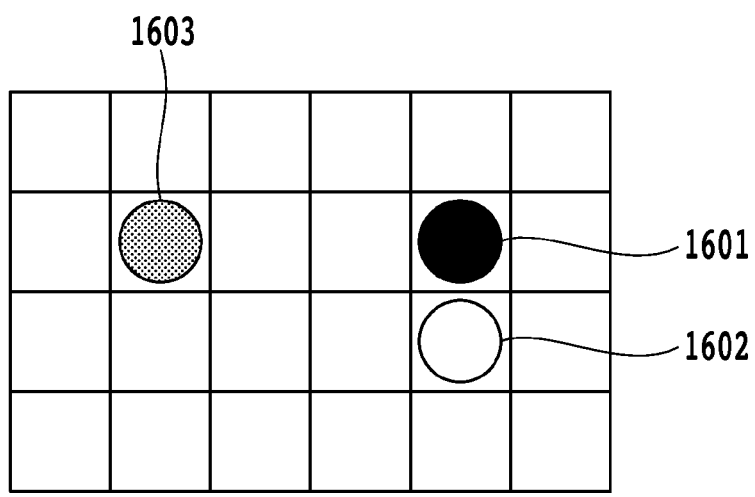

As was mentioned in the section on the background of the invention, when dots that are printed by different scans or different printing element groups are shifted and overlap, density fluctuation occurs in an image, and this is perceived as density unevenness. Therefore, in the present invention, some dots that are to overlap and be printed at the same position (same pixel or same sub pixel) are prepared beforehand, and when the shift between printing positions occurs, adjacent dots are adapted to overlap each other to increase blank areas, and overlapping dots are adapted to separate from each other to decrease blank areas. In this way, the increase and decrease in blank areas, or in other words, the increase and decrease in density due to the shift in printing position compensate for each other, and therefore suppression of a change in density of the overall image can be expected. However, as was explained using FIGS. 10B and 10C, preparing the overlapping dots in advance is connected with worsening of the graininess. Also, in the case of overlapping too many dots, the dot coverage rate over a printing medium may become insufficient on, for example, plain paper where the dot is likely to appear smaller, to cause density shortage. That is, when adjusting the number of overlapping dots to be prepared, it can be said that there is a tradeoff relationship between the above-described density unevenness and the graininess or density shortage.

However, as already explained, there are also certain allowable ranges for both the above density change and graininess or density shortage, and the allowable ranges change depending on a printing medium, user-specified printing quality, or the like. Therefore, the present invention is adapted to, while a configuration is prepared that can control the dot overlap rate, depending on the printing mode determined by the type of the printing medium or the like, positively adjust the dot overlap rate to keep a balance between the density unevenness and the graininess or density shortage in all printing modes.

Here, the "dot overlap rate" will be explained. The "dot overlap rate" is, as illustrated in FIGS. 4A to 4H and FIG. 15, the ratio of the number of dots that overlap (overlapping dots) and are printed in the same pixel by a different scan or different printing element group, among the total number of dots that are to be printed in a unit area including K (K is an integer 1 or greater) pixels. Note that the same pixel refers to the same pixel position in the case of FIGS. 4A to 4H, and to a sub pixel position in the case of FIG. 15.

In the following, the dot overlap rate between the first plane and the second plane that correspond to a unit area including 4 pixels (main scanning direction)×3 pixels (sub scanning direction) is explained using FIGS. 4A to 4H. Note that the "first plane" represents a collection of binary data that corresponds to the first scan or first nozzle array, and the "second plane" represents a collection of binary data that corresponds to the second scan or second nozzle array. Moreover, "1" represents data that indicate that a dot will be printed, and "0" represents data that indicate that a dot will not be printed.

In FIGS. 4A to 4E, the number of "1s" in the first plane is "4", and the number of "1s" in the second plane is also "4", so that the total number of dots to be printed in the unit area including 4 pixels×3 pixels is "8". On the other hand, the number of "1s" that correspond to the same pixel position in the first plane and the second plane becomes the number of dots that will overlap and be printed in the same pixel (overlapping dots). According to this definition, the number of overlapping dots in the case of FIG. 4A is "0", in the case of FIG. 4B is "2", in the case of FIG. 4C is "4", in the case of FIG. 4D is "6" and in the case of FIG. 4E is "8". Therefore, as illustrated in FIG. 4H, the respective dot overlap rates for FIGS. 4A to 4E are 0%, 25%, 50%, 75%, and 100%. Further, FIG. 4F illustrates the case where the number of dots printed in the first plane is "4", the number of dots printed in the second plane is "3", the total number of dots is "7", the number of overlapping dots is "6", and the dot overlap rate is 86%. In addition, FIG. 4G illustrates the case where the number of dots printed in the first plane is "4", the number of dots printed in the second plane is "2", the total number of dots is "6", the number of overlapping dots is "2", and the dot overlap rate is 33%.

As described, the "dot overlap rate" in this specification is the overlap rate of dot data when the dot data that correspond to different scan or different printing element groups virtually overlap.

Table 1 is a list for explaining a plurality of printing modes prepared in the embodiments of the present invention, and corresponding multipass numbers and dot overlap rates. Here, for simplicity, it is assumed that, as the type of printing medium, two types of printing media, i.e., inkjet dedicated paper and plain paper, are prepared, and as for printing quality, three types of quality, i.e., "fast", "standard", and "fine", are prepared. In an actual print apparatus, much more types of printing media and much more types of printing modes are typically prepared. Regarding specifying such a printing medium and printing quality, as already explained, the user may use the operating panel 1010 to make the settings, or the settings may be made through the printer driver inside the PC 3010, or alternatively the control unit 3000 may be configured to automatically make the specification.

TABLE 1

Combinations of types of printing media and quality

| | | Printing quality | | |
|---|---|---|---|---|
| | | Fast | Standard | Fine |
| Type of printing medium | Inkjet dedicated paper | — | 2-pass Dot overlap rate: Large | 16-pass Dot overlap rate: Small |
| | Plain paper | pass High speed | 2-pass Standard speed | 2-pass Dot overlap rate: Small |

In Table 1, for the inkjet dedicated paper, the two types of printing modes, i.e., "standard" and "fine", are prepared. In the "standard" mode, 2-pass multipass printing is performed, and in the "fine" mode, 16-pass multipass printing is performed.

Figure 5:
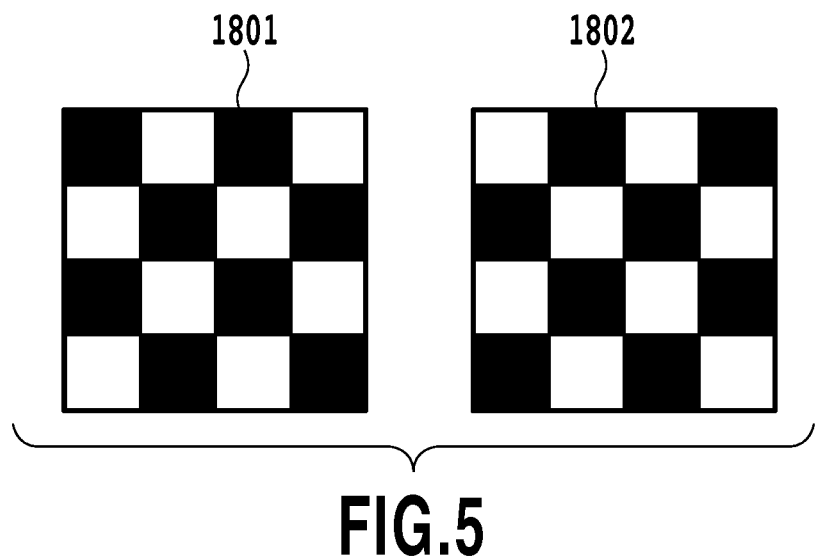
FIG. 5 is a diagram that illustrates one example of an applicable mask in the present invention.
Figure 12A:
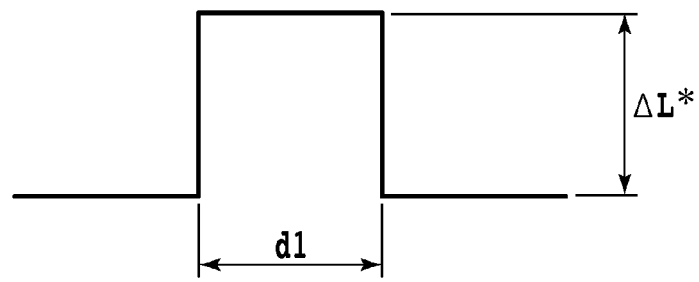
FIGS. 12A to 12C are diagrams for comparing the degree of density change (lightness change) depending on the multipass number or the type of recording medium.
Figure 12B:
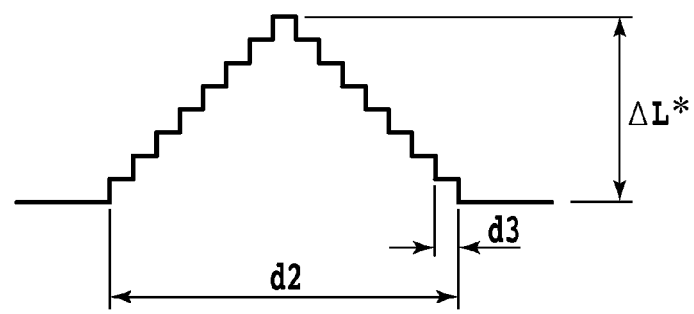
Figure 12C:
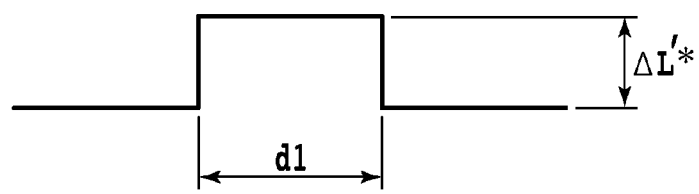

FIGS. 12A to 12C are diagrams for comparing how much density change (lightness change) occurs depending on the multipass number or the type of recording medium in the case where a position shifting of plane occurs in one printing scan when general multipass printing is performed. The general multipass printing here refers to multipass printing that is performed using mask patterns having a complementary relationship as illustrated in FIG. 5, and dots printed in each printing scan are unlikely to overlap and be printed unless a shift between planes occurs. Accordingly, if a printing position shift occurs in one plane, an overlap position of adjacent dots appears, and a coverage rate, i.e., the density is reduced as compared with the case of no occurrence of the printing position shift.

In FIGS. 12A to 12C, the horizontal axis represents a printing position in the sub scanning direction on the printing medium, and the vertical axis represents a lightness change amount ($\Delta L^*$). In this case, the lightness is a physical quantity that can be optically measured similarly to the density, and has a relationship opposite to that of the density. Accordingly, in the diagrams, it is shown that an area having a high lightness as compared with the other areas (for example, an area indicated by d1 in FIG. 12A) has a low density as compared with the other area.

FIG. 12A illustrates a lightness change for the case where a printing position shift occurs when 2-pass printing is performed on inkjet dedicated paper. In the case of the 2-pass multipass printing, the conveying operation having a distance corresponding to ½ of the printing width of the printing head 5004 is performed for every printing scan, and therefore in the unit area having a width corresponding to ½ of the printing width, dots are printed by two different printing scans. Therefore, if an unexpected conveyance error occurs in one conveying operation, the influence of printing position shift appears in one unit area in which two printing scans are performed while sandwiching the one conveying operation. That is, each of the number of positions in which a dot printed by one printing scan overlaps a dot printed by another printing scan increases, and thereby the coverage rate is decreased to decrease the density (increase the lightness). In FIG. 12A, the width of the area on which such a printing position shift has an influence is denoted by d1, and the width is equal to the unit area, i.e., ½ of the printing width.

On the other hand, FIG. 12B illustrates a lightness change for the case where a printing position shift occurs when 16-pass printing is performed on dedicated paper for ink jet printing. In the case of the 16-pass multipass printing, the conveying operation having a distance corresponding to ¹⁄₁₆ of the printing width of the printing head 5004 is performed for every printing scan, and therefore in the unit area having a width corresponding to ¹⁄₁₆ of the printing width, dots are printed by sixteen different printing scans. Therefore, if an unexpected conveyance error occurs in one conveying operation, the influence of printing position shift appears in fifteen unit areas in which sixteen printing scans are performed while including the one conveying operation.

At this time, a dot group printed by m printing scans prior to the occurrence of the conveyance error shifts from a dot group printed by (16−m) printing scans subsequent to the occurrence of the conveyance error, and thereby the coverage rate is decreased to decrease the density (increase the lightness). An area where the coverage rate exhibits the biggest reduction is the unit area corresponding to m=8 where dot groups each having almost a half of the total number of dots shift from each other, and therefore the reduction in density (increase in lightness) in this unit area is the maximum. Also, around this unit area (m=8), when increasing the distance from the unit area, a reduction in density (increase in lightness) gradually decreases. As described, in the 16-pass multipass printing, in an area where the fifteen unit areas corresponding to m=1 to 15 continues, the influence of the printing position shift appears stepwise.

In FIG. 12B, the width of the area on which such a printing position shift has an influence is denoted by d2, and an increase in lightness in the unit area corresponding to m=8, i.e., the maximum value of the lightness increase is denoted by $\Delta L^*$. The width d2 of the area on which the printing position shift has an influence is fifteen times the unit area (d3), i.e., ¹⁵⁄₁₆ of the printing width, and is large as compared with the width d1 for the case of the 2-pass multipass printing (¹⁵⁄₁₆>½). On the other hand, the maximum value $\Delta L^*$ of the lightness increase is the same as the maximum value of the lightness increase in the case of the 2-pass multipass printing illustrated in FIG. 12A; however, the width of the area exhibiting the $\Delta L^*$ is small (¹⁄₁₆<½).

That is, even in the same dedicated paper for ink jet printing, in the 16-pass multipass printing as compared with the 2-pass multipass printing, the density change in the conveying direction is gradual and covers over a wide range, and therefore the density unevenness due to the printing position shift tends to be difficult to recognize. On the other hand, in the 16-pass multipass printing performed in the case where the printing quality is set to "fine", the already-explained graininess is emphasized. Therefore, assuming that the two printing mode set for the inkjet dedicated paper are referred to as the "first printing mode" and the "second printing mode", in the first printing mode where "standard" is set, priority is given to the density unevenness reduction than to the graininess suppression, and therefore the above-described dot overlap rate is set relatively high. On the other hand, in the second printing mode where "fine" is set, priority is given to the graininess suppression than to the density unevenness reduction, and therefore the dot overlap rate is set relatively low.

Referring again to Table 1, for plain paper in the present embodiment, the three types of printing modes are prepared, i.e., "fast", "standard", and "fine". In the "fast" and "standard" modes, the 1-pass printing is performed, whereas in the "fine mode", the 2-pass multipass printing is performed. Note that, between the "fast" and "standard" 1-pass modes, the scanning speed of the carriage 5008, the ejection frequency following the scanning speed, and the like are made different. In the "standard" mode, the scanning speed of the carriage and the ejection frequency of the printing head are set to standard values that are the same as those in each of the above-described printing modes for the ink jet dedicated paper. On the other hand, in the "fast" mode, the scanning speed of the carriage is set higher than the standard, and along with this, the ejection frequency of the printing head is set higher than the standard, or set such that printing is performed at the standard ejection frequency with thinning printing data. In such 1-pass modes, a dot to be printed in the unit area is not printed while being divided for a plurality of printing scans, so that the dot overlap rate cannot be controlled, and therefore the dot overlap rate is constantly 0%.

On the other hand, in the plain paper "fine" mode, the 2-pass multipass printing is set, which is the same as in the inkjet dedicated paper "standard" mode. However, even in the case of the occurrence of an equivalent printing position shift by the same 2-pass multipass printing, between the plain paper and the ink jet dedicated paper, the degree of density reduction, i.e., visible appearance of density unevenness, is different.

FIG. 12C is a diagram for explaining a lightness change where the printing position shift occurs when 2-pass printing is performed on the plain paper while comparing the lightness change with FIG. 12A that is explained for the case of the ink jet dedicated paper. Even in the case of the plain paper, printing is performed on the basis of the 2-pass printing, and therefore the width d1 of an area on which the printing position shift has influence corresponds to ½ of the printing width similarly to FIG. 12A. However, in the case of the plane paper, as compared with the ink jet dedicated paper, ink is unlikely to accumulate on the surface of the printing medium, so that the density of the formed dot itself is low, and therefore the influence of the printing position shift on the coverage rate or density is also small. Therefore, as compared with the case of the ink jet dedicated paper illustrated in FIG. 12A, the degree of lightness increase is low ($\Delta L'^* < \Delta L^*$).

Further, on the plain paper, the formed dot itself is small, and low in density, and therefore if the dot overlap rate is set more than required, a reduction in dot coverage rate may cause density shortness in a high density area.

Therefore, assuming that the "standard" mode for the ink jet dedicated paper is referred to as the first printing mode, and the "fine" mode for the plain paper is referred to as the second printing mode, in the second printing mode in which printing is performed on a printing medium (plain paper) having low ink absorbability, priority is given to the suppression of density shortness than to reduction in density unevenness, and therefore the dot overlap rate is set lower than in the first printing mode in which printing is performed on a printing medium (dedicated paper) having high ink absorbability.

Note that, in the explanation using Table 1, both of the "fine" mode for the ink jet dedicated paper and the "fine" mode for the plain paper are explained in which the dot overlap rates are set low as compared with that in the "standard" mode for the ink jet dedicated paper. In such a case, the dot overlap rates in the "fine" mode for the ink jet dedicated paper and in the "fine" mode for the plain paper may have the same value, or may be set to different values. If, depending on the degree of each of the density unevenness, graininess, and density shortage in a high density area due to the printing position shift, an appropriate dot overlap rate is properly set in each of the printing modes, the effect of the present invention can be produced.

Also, image processing in which the dot overlap rate is controlled for each of the printing modes as described above is not necessarily performed over all gradation values (all density range), but may be performed for at least a part of the density range. In this case, in an intermediate density area, the change in coverage rate due to the printing position shift is large as compared with a low or high density area, and therefore, at least in the intermediate density area, the dot overlap rate is preferably controlled for each of the printing modes.

In the following, a specific image processing method for controlling the dot overlap rate for each of the printing modes as described above is explained with a plurality of embodiments as examples.

First Embodiment

Figure 3:
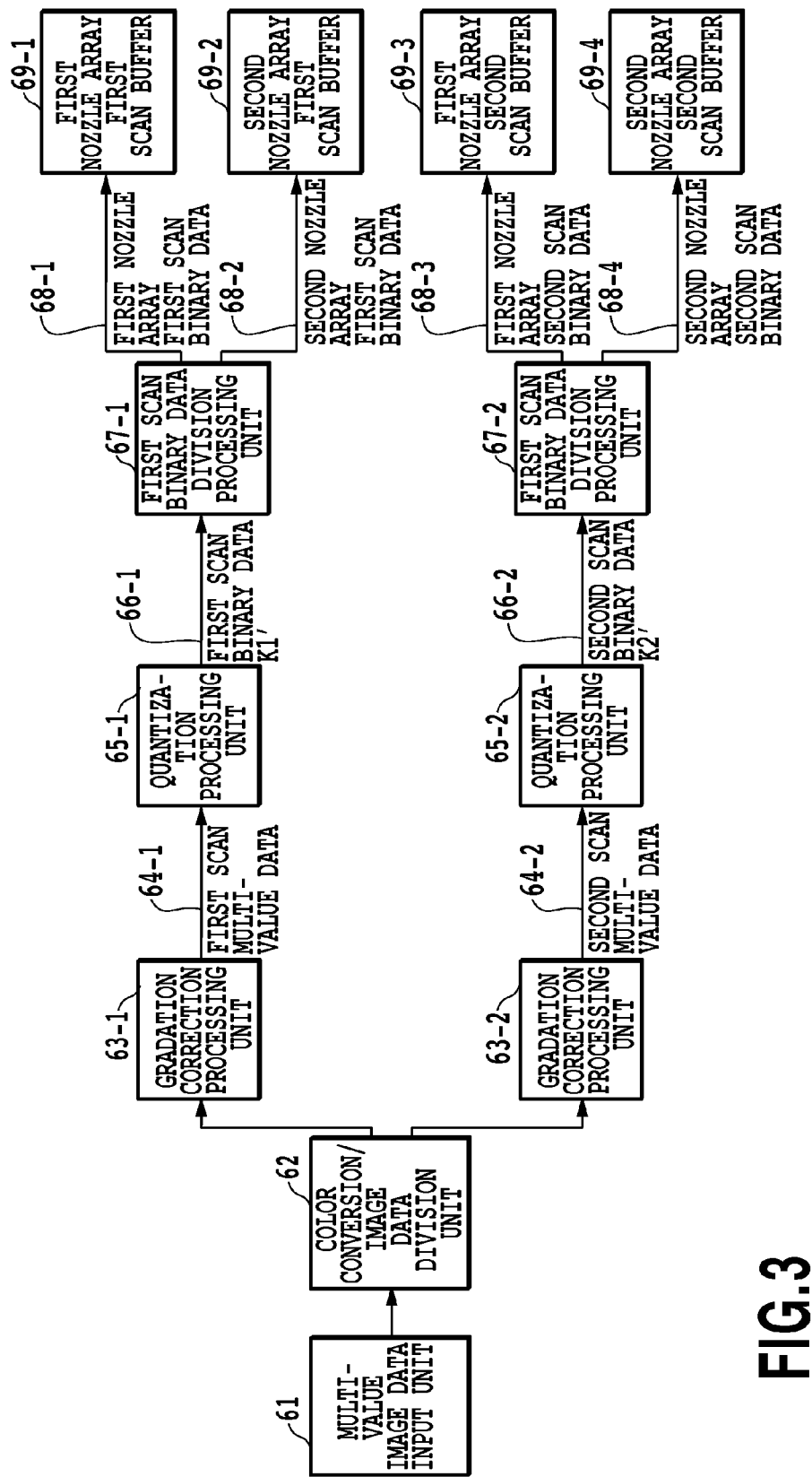
FIG. 3 is a block diagram for explaining the steps of image processing in the first embodiment.

FIG. 3 is a block diagram for explaining image processing for the case of performing multipass printing to complete an image in the same area on a printing medium by two printing scans as illustrated in FIG. 7. The control unit 3000 is provided with the following: a multi-value image data input unit (61), a color conversion/image data division unit (62), gradation correction processing units (63-1, 63-2), and quantization processing units (65-1, 65-2). On the other hand, the printer engine 3004 is provided with binary data division processing units (67-1, 67-2).

When multi-value RGB image data (256 values) are inputted from an external device through the multi-value image data input unit 61, this inputted image data (original image) are inputted to the color conversion/image data division unit 62 on a pixel basis. Then, two sets of multi-value image data (multi-value density data) for first and second printing scans, which correspond to respective ink colors (CMYK), are generated. Specifically, in the color conversion/image data division unit 62, a three-dimensional look-up table (LUT) is provided in advance for each of the printing modes, in which an RGB value and CMYK values for the first and second scans are related one on one. By using the LUT, from the RGB data, the multi-value density data for the first scan and the multi-value density data for the second scan are generated simultaneously. At this time, in the case of the input value not corresponding to any table grid point value, the output value may be calculated by interpolation based on output values at table grid points around the input value. Such color conversion/image data division unit 62 is in charge of two types of processing, i.e., conversion processing that color-converts the RGB data to the CMYK data, and division processing that divides the multi-value image data into a plurality of planes.

As described, the color conversion/image division unit 62 plays the role as a data generation unit that, on the basis of the inputted image data corresponding to a pixel, generates the multi-value data (CMYK) for the first scan and the multi-value data (CMYK) for the second scan. In the present embodiment, by characterizing the data conversion performed in the color conversion/image data division unit, the control of the dot overlap ratio is achieved for each of the printing modes. A detailed method for the control will be described later.

The generated first scan multi-value data and second scan multi-value data are applied with gradation correction processing for each of the colors in the gradation correction processing units 63-1 or 63-2 respectively. Here, signal value conversion of the multi-value data is performed so as to obtain a linear relationship between the signal value of the multi-value data and the density value presented on the printing medium. As a result, the multi-value data for the first scan 64-1 (C1, M1, Y1, K1) and the multi-value data for the second scan 64-2 (C2, M2, Y2, K2) are obtained. Subsequent processing is performed in the same manner for each of CMYK, and therefore the following explanation is provided only for the case of K.

The quantization processing unit 65-1 performs binarization processing of the multi-value data 64-1 (K1) for the first scan as quantization processing to generate binary data K1' 66-1 for the first scan. Also, the quantization processing unit 65-2 performs binarization processing of the multi-value data 64-2 (K2) for the second scan to generate binary data K2' 66-2 for the second scan. In the present embodiment, the quantization method employed in the two quantization processing units 65-1 and 65-2 is a typical error-diffusion method. When performing the quantization processing, in order to adequately mix pixels in which dots are printed in both scans and pixels in which dots are printed in only one scan, it is preferable that a different diffusion matrix be used for these two types of error-diffusion processing. For example, the quantization processing unit 65-1 uses the diffusion matrix illustrated in FIG. 9A, whereas the quantization processing unit 65-2 uses the diffusion matrix illustrated in FIG. 9B. As a result of the two types of quantization processing, dots overlap and are printed in pixels for which both of K1' and K2' are 1, whereas no dot is printed in pixels for which both K1' and K2' are 0. Also, only one dot is printed in pixels for which only one of K1' and K2' is 1.

After the binary image data K1' and K2' have been obtained by the quantization processing units 65-1 and 65-2, the data are sent to the printer engine 3004 illustrated in FIG. 2 via the IEEE 1284 bus 3022. The processing after this is performed by the printer engine 3004.

In the printer engine 3004, the binary image data K1' (66-1) and K2' (66-2) are divided into binary data that correspond to the two nozzle arrays 54 and 55 illustrated in FIG. 15. In other words, the binary image data K1' (66-1) for the first scan is divided by the first scan binary data division processing unit 67-1 into binary data 68-1 for the first scan by the first nozzle array, and binary data 68-2 for the first scan by the second nozzle array. Also, the binary image data K2' (66-2) for the second scan is divided by the second scan binary data division processing unit 67-2 into binary data 68-3 for the second scan by the first nozzle array, and binary data 68-4 for the second scan by the second nozzle array.

In the present embodiment, the first scan binary data division processing unit 67-1 and second scan binary data division processing unit 67-2 perform the division processing by using masks that are stored beforehand in a memory (ROM E1004). A mask is a collection of data for which whether to allow printing (1) or not to allow printing (0) of binary image data is preset for each individual pixel, and divides the binary image data by performing a logical AND operation for each binary image data and each pixel.

In the case of dividing binary image data into N divisions, normally N masks are used, and in the present embodiment in which the binary image data are divided into two divisions, two masks 1801 and 1802 as illustrated in FIG. 5 are used as an example. In the diagram, portions indicated by black correspond to data for which printing image data are allowed (1: data for which image data are not masked), and portions indicated by white correspond to data for which printing image data is not allowed (0: data for which image data are masked). Here, the mask 1801 is used for generating binary data for the first nozzle array, and the mask 1802 is used for generating binary data for the second nozzle array. That is, the first scan binary data division processing unit 67-1 generates the binary data 68-1 for the first nozzle array by performing a logical AND operation of the binary data K1' (66-1) and the mask 1801 for each pixel. Similarly, the first scan binary data division processing unit 67-1 generates the binary data 68-2 for the second nozzle array by performing a logical AND operation of the binary data K1' (66-1) and the mask 1802 for each pixel. On the other hand, the second scan binary data division processing unit 67-2 generates the binary data 68-3 for the first nozzle array by performing a logical AND operation of the binary data K2' (66-2) and the mask 1801 for each pixel. Similarly, the second scan binary data division processing unit 67-2 generates the binary data 68-4 for the second nozzle array by performing a logical AND operation of the binary data K2' (66-2) and the mask 1802 for each pixel.

The two masks 1801 and 1802 have a complementary relationship with each other, and therefore binary data divided by these masks will not overlap each other. Therefore, the probability that dots printed by the different nozzle arrays will overlap on the surface of the paper is kept low, and as compared with the dot overlap rate control that is performed between scans as described above, it is more difficult for graininess to worsen. In the present embodiment, the first scan binary data division processing unit 67-1 and second scan binary data division processing unit 67-2 use the same mask set (1801 and 1802), however; they may use a different mask set.

After that, the binary image data (68-1 to 4) are stored in buffers 69-1 to 4 that are prepared for each scan that corresponds to a corresponding nozzle array. After the necessary amount of binary image data has been stored in each individual buffer, the printing operation is performed by the corresponding scans and nozzle arrays according to the stored data.

The characteristic processing method for controlling the dot overlap rate of the present embodiment is explained below. Table 2 illustrates the distribution rates when the color conversion/image data division processing unit 62 divides data to multi-value data for the first scan and for the second scan, and dot overlap rates in the first scan and second scan when the typical error-diffusion process is performed on each of the multi-value data. The printing rate (%) corresponds to the number of dots of one color of ink, which are printed per unit area, and is defined as 0% when no dot is printed per unit area, and as 100% when the maximum number of dots is printed per unit area. Therefore, for example, a printing rate of 60% indicates a state in which dots corresponding to 60% of the maximum number of dots are printed per unit area. In Table 2, this kind of printing rate is given in ten levels from 0 to 100%. As will be described later, this printing rate (0 to 100%) is correlated with the total value (0 to 255) of the multi-value density data of the same color that corresponds to different scans, and the larger the value of the printing rate becomes, the larger the total value becomes. Moreover, the distribution rate (%) refers to the ratio of the value of the density data of each scan with respect to the total value of multi-value density data of a plurality of scans (printing rate) of the same color, where the total of the distribution rates is 100%. As described, the distribution rate corresponds to the ratio (distribution ratio) of a plurality of density data values of the same color after conversion of the inputted image data (RGB) (for example K1: K2). For example, consider the case where the total value of a plurality of density data that corresponds to a plurality of scans is 128 (printing rate of 50%), the density data value for the first scan is 64 (printing rate of 25%), and the density data value for the second scan is also 64 (printing rate of 25%). In this case, the distribution rates of the first scan and the second scan are both 50%, and the ratio between the first density data for the first scan and the second density data for the second scan becomes 1:1. In Table 2, this kind of distribution rate is given in 6 levels. In addition, the dot overlap rates resulting from binarization processing by the typical error-diffusion method are listed in each column of Table 2 according to each of the distribution rate and printing rate conditions.

TABLE 2

| Distribution rate(%) | | Printing rate(%) | | | | | | | | |
|---|---|---|---|---|---|---|---|---|---|---|
| First scan | Second scan | 10 | 20 | 30 | 40 | 50 | 60 | 70 | 80 | 90 | 100 |
| 100 | 0 | 0 | 0 | 0 | 0 | 0 | 0 | 0 | 0 | 0 | 0 |
| 90 | 10 | 1.8 | 3.6 | 5.4 | 7.2 | 9 | 10.8 | 12.6 | 14.4 | 16.2 | 18 |
| 80 | 20 | 3.2 | 6.4 | 9.6 | 12.8 | 16 | 19.2 | 22.4 | 25.6 | 28.8 | 32 |
| 70 | 30 | 4.2 | 8.4 | 12.6 | 16.8 | 21 | 25.2 | 29.4 | 33.6 | 37.8 | 42 |
| 60 | 40 | 4.8 | 9.6 | 14.4 | 19.2 | 24 | 28.8 | 33.6 | 38.4 | 43.2 | 48 |
| 50 | 50 | 5 | 10 | 15 | 20 | 25 | 30 | 35 | 40 | 45 | 50 |

Figure 6:
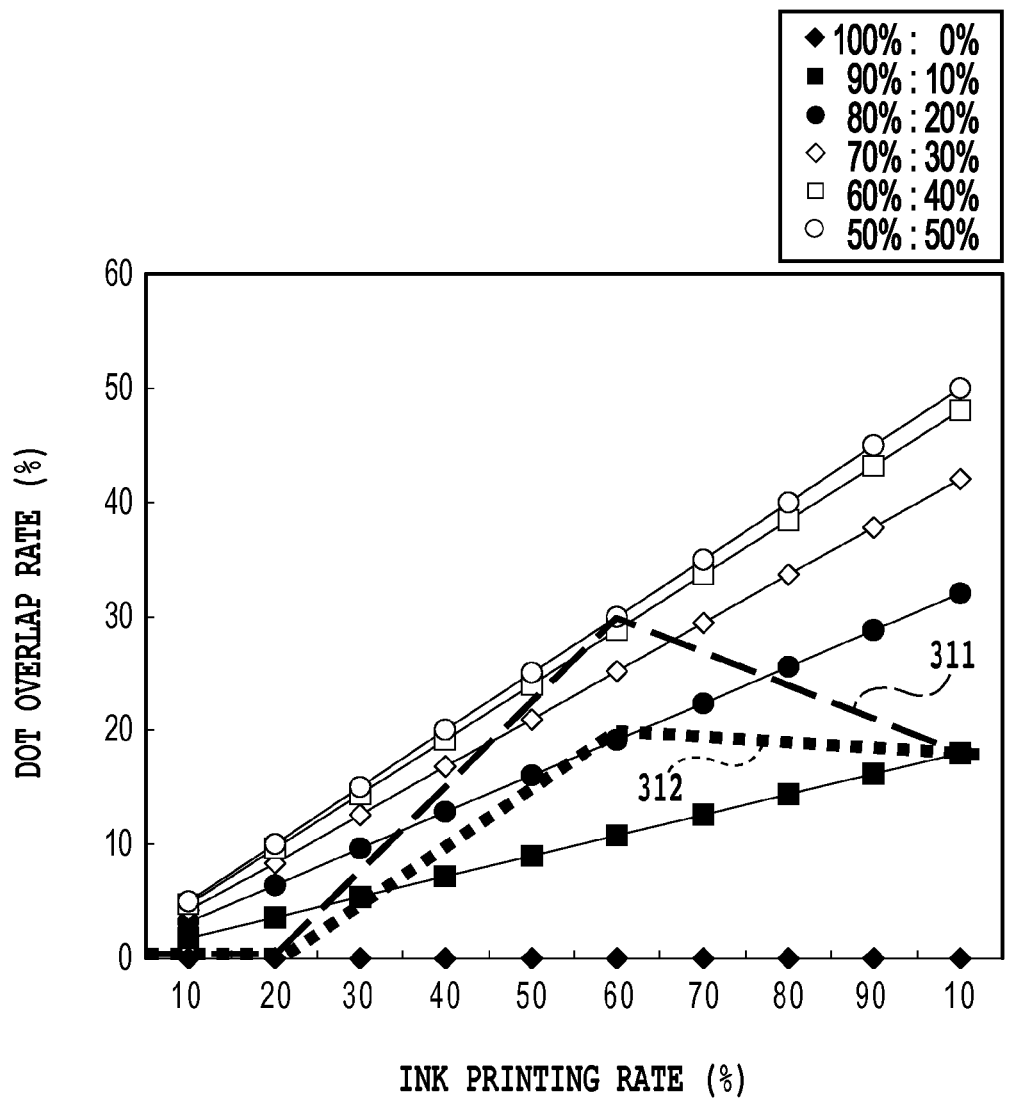
FIG. 6 is a diagram illustrating the relationship between the distribution rate and dot overlap rate in the first embodiment.

FIG. 6 is a graph of Table 2. In the diagram, the horizontal axis represents the printing rate, and the vertical axis represents the dot overlap rate. The graph illustrates the dot overlap rate with respect to the printing rate for each of the distribution rates of the 6 levels illustrated in Table 2 as lines having different slopes.

For example, when the distribution rate of the first printing scan is 100% and the distribution rate of the second printing scan is 0%, then all of the multi-value data are printed only by the first printing scan. Therefore, there is no dot overlap, and even though the printing rate is increased, the dot overlap rate remains at 0%. As the distribution rate of the second printing scan is gradually increased, the slope of the dot overlap rate with respect to the printing rate gradually increases. Moreover, when the distribution rates of the first scan and second scan are both 50%, the slope of the dot overlap rate with respect to the printing rate is the maximum, and when the printing rate is 100%, the dot overlap rate becomes 50%.

Therefore, if the dot overlap rates with respect to the distribution rates as illustrated in Table 2 or FIG. 6 are obtained in advance, it becomes possible to achieve a suitable dot overlap rate for each of the printing modes by adjusting the distribution rate according to the printing mode.

In the present embodiment, it is possible to perform even more detailed control of the dot overlap rate. Generally, in addition to the printing mode, out of the areas of all printing rates (0% to 100%), in areas of intermediate gradation, or in other words, in areas where dots are printed or not printed adjacent to each other, the change in dot overlap state easily affects the dot coverage rate on the paper surface. Therefore, in these kinds of intermediate density areas, it is particularly easy for density unevenness to become a problem, and therefore preferably the dot overlap rate is set higher than in other density areas (low density areas, high density areas). On the other hand, in low density areas where it is difficult for density unevenness to become a problem, preferably, priority is given to reduction in graininess than to reduction in density unevenness to set the dot overlap rate low. Also, in high density areas, preferably, priority is given to increase in density than to reduction in density unevenness to set the dot overlap rate low. Therefore, in the present embodiment, the dot overlap rate is adjusted according to not only the printing mode but also the printing rate.

The solid dashed lines 311 and 312 in FIG. 6 illustrate the adjustment of the dot overlap rate according to the printing rate (i.e., total value of a plurality of multi-value density data that corresponds to different scans) as illustrated in Table 2. In the present embodiment, in the case of the plain paper "fine" mode, the dot overlap rate is controlled by the curve 312, whereas in the case of the inkjet dedicated paper "standard" mode, the dot overlap rate is controlled by the curve 311. In the case of the plain paper "fine" mode, in order to achieve a dot overlap rate as indicated by curve 312, the distribution rate at a printing rate of 0 to 20% is taken to be (100%:0%), and at a printing rate of 20 to 60%, the distribution rate is gradually changed until it becomes (80%:20%). In addition, in high density areas where the printing rate is 60 to 100%, the distribution rate is gradually changed until it becomes (90%: 10%). On the other hand, in the case of the inkjet dedicated paper "standard" mode, in order to achieve a dot overlap rate as indicated by curve 311, the distribution rate at a printing rate of 0 to 20% is taken to be (100%:0%), and at a printing rate of 20 to 60%, the distribution rate is gradually changed until it becomes (50%:50%). Moreover, in high density areas where the printing rate is 60 to 100%, the distribution rate is gradually changed until it becomes (90%:10%). Note that, in order to suppress the generation of a pseudo contour, the above-described distribution rate adjustment is preferably performed to change as smoothly as possible with respect to the change in printing rate.

In the present embodiment, even in the case of the plain paper "fine" mode or the inkjet dedicated paper "standard" mode, the point of making the dot overlap rate maximum at a printing rate of approximately 60% is the same. However, even at any ink printing rate, the dot overlap rate in the plain paper "fine" mode does not exceed the dot overlap rate in the inkjet dedicated paper "standard" mode. In other words, even in the two modes where the same 2-pass multipass printing is performed, the dot overlap rate in the plain paper "fine" mode where the density is likely to become lower is set to be the same or less than the dot overlap rate in the inkjet dedicated paper "standard" mode in all printing rate areas.

In the above, the 2-pass multipass printing was explained as an example; however, the method of controlling the dot overlap rate by this kind of adjustment of the distribution rate can also be applied to 3-pass or greater multipass printing. In such a case, it is only necessary that the color conversion/image data division unit 62 illustrated in FIG. 3 divides data into M pieces of multi-value density data that respectively correspond to M printing scans, and quantization processing is performed for each of the pieces of multi-value image data. In addition, it is also only necessary that the relationship between the printing rate and the dot overlap rate as illustrated in FIG. 6 is obtained in advance for M passes, and the color conversion/image data division unit divides the data into M pieces of multi-value density data according to a distribution rate that makes possible a dot overlap rate that is suitable to the original image. By doing so, in the inkjet dedicated paper "fine" mode illustrated in Table 1, similar to the above-described example, a desired dot overlap rate can be achieved in the 16-pass multipass printing.

As described, in the present embodiment, in order to optimally set a dot overlap rate according to the printing mode, multi-value image data are divided into M planes according to a distribution rate corresponding to the printing mode.

Incidentally, in the present embodiment, the color conversion/image data division unit 62 generates a plurality of density data (plurality of CMYK sets) corresponding to a plurality of scans at once from inputted image data (RGB), and therefore the parameters that correspond to the "printing rate" illustrated in Table 2 or FIG. 6 are not actually handled. However, the total value of the plurality of density data of the same color after the generation is correlated with the printing rate, and as the total value becomes large, the printing rate after binarization also becomes large as a result. That is, the total value of the plurality of density data that corresponds to different scans corresponds to the "printing rate". Therefore, in actual processing, the inputted image data (RGB) and the plurality of density data (plurality of CMYK sets) can be correlated so that the relationship in the 3-dimensional LUT between the total value of a plurality of density data of the same color (printing rate) and the distribution rate satisfies the graph illustrated in FIG. 6. Then, such an LUT is used to generate data in the color conversion/image data division unit 62. By doing so, the ratio of the plurality of density data of the same color (distribution rate) is primarily set according to the inputted image data that is correlated with the printing rate and total value described above, so that the relationship between the printing rate and the distribution rate as illustrated in Table 2 can be satisfied without using the "printing rate" parameter. Therefore, it is possible to achieve a dot overlap rate that corresponds to the printing rate as illustrated in FIG. 6.

However, in the present invention and the present embodiment, it is not absolutely necessary for the color conversion/image data division unit 62 to convert the multi-value brightness data (RGB) to a plurality of multi-value density data (CMYK) corresponding to a plurality of scans at once by using the 3-dimensional LUT as illustrated in FIG. 3. The processing of color converting RGB to CMYK and the processing of dividing CMYK into the plurality of multi-value density data corresponding to the plurality of scans may be provided independently. In such a case, the plurality of multi-value density data can be generated according to the distribution rate that is set according to multi-value data after the color conversion, or in other words, according to the distribution rate illustrated in FIG. 6.

Note that, in Table 2, the distribution rates are provided in the color conversion/image data division processing unit 62 such that the sum of the distribution rates for the first printing scan and the second printing scan is 100%; however, the present embodiment is not limited to this. Depending on the type of image processing or the objective of improving the absolute density, the sum of distribution rates for the first printing scan and for the second printing scan may be greater than 100%, or may be less than 100%.

As explained above, according to the present embodiment, by changing the ratio of multi-value density data for the same color that corresponds to a plurality of scans (distribution rate) according to the printing mode, it is possible to achieve a dot overlap rate that corresponds to the printing mode. Based on this, it is possible to output a good image suitable to the printing mode by lowering the dot overlap rate in a printing mode where density shortage or graininess is taken into consideration more than density unevenness, rather than a dot overlap rate in a printing mode where the density unevenness is taken into consideration more than the density shortage or graininess.

Figure 8:
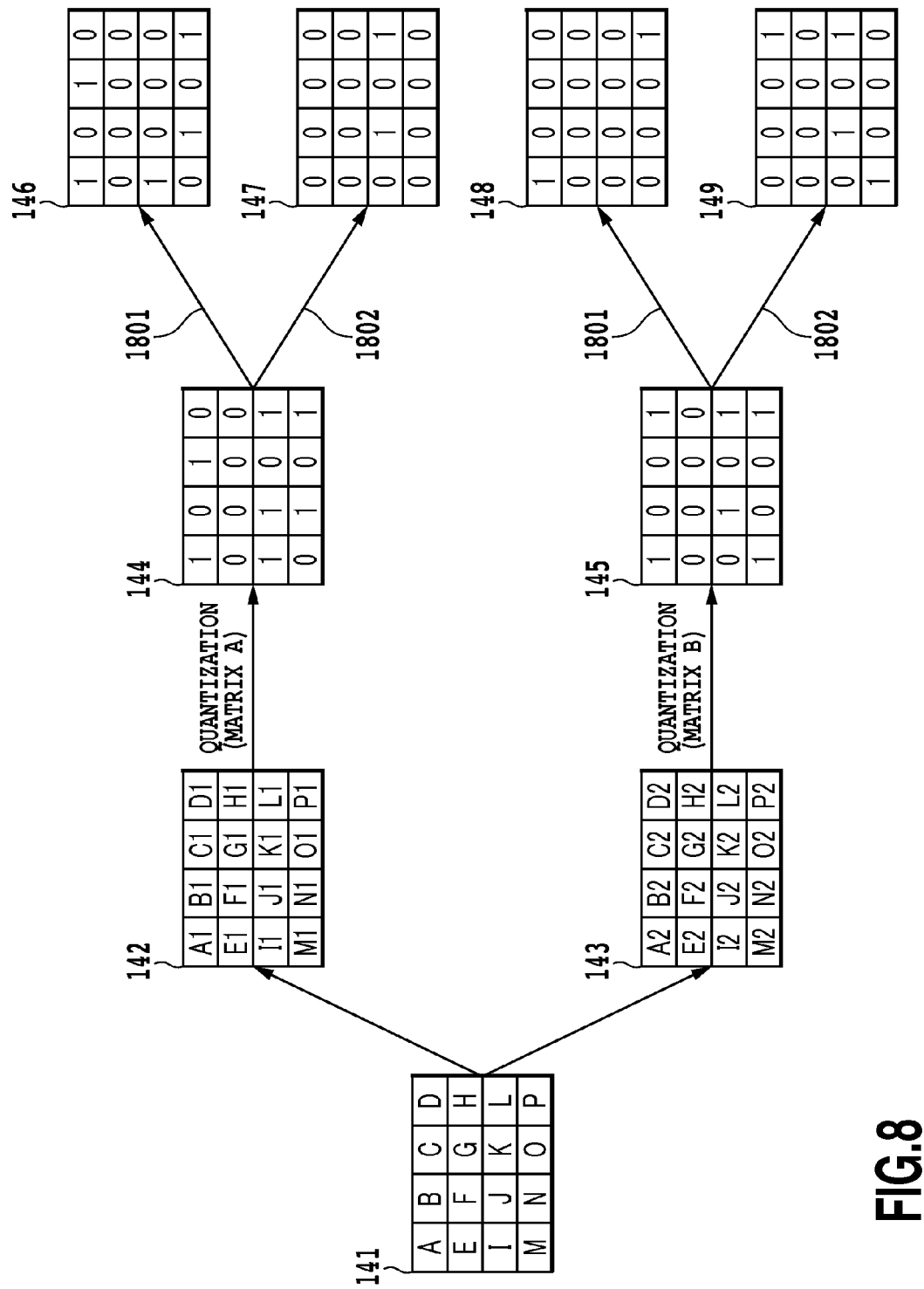
FIG. 8 is a schematic diagram for explaining a detailed example of the image processing illustrated in FIG. 3.

The image processing explained using FIG. 3 will be explained in more detail below using FIG. 8. FIG. 8 is an image of a specific example of the image processing illustrated in FIG. 3. Here, the case of processing input image data 141 corresponding to 4 pixels×4 pixels for a total of 16 pixels is explained. In the diagram, Reference codes A to P indicate a combination of RGB values of the input image data 141 that correspond to each of the pixels. In addition, Reference codes A1 to P1 indicate a combination of CMYK values of multi-value image data 142 for the first scan corresponding to each of the pixels. Also, Reference codes A2 to P2 indicate a combination of CMYK values of multi-value image data 143 for the second scan corresponding to each of the pixels.

In the diagram, the multi-value image data for the first scan 142 correspond to the multi-value data for the first scan 64-1 in FIG. 3, and the multi-value image data for the second scan 143 correspond to the multi-value data for the second scan 64-2. Moreover, quantized data for the first scan 144 correspond to the binary data for the first scan 66-1, and quantized data for the second scan 145 correspond to the binary data for the second scan 66-2. Further, quantized data for the first scan 146 that correspond to the first nozzle array correspond to the binary data 68-1, and quantized data for the first scan 147 that correspond to the second nozzle array correspond to the binary data 68-2. In addition, quantized data for the second scan 148 that correspond to the first nozzle array correspond to the binary data 68-3, and quantized data for the second scan 149 that correspond to the second nozzle array correspond to the binary data 68-4.

The input image data 141 (RGB data) are inputted to the color conversion/image data division unit 62 illustrated in FIG. 3. The color conversion/image data division 62 uses a 3-dimensional LUT corresponding to the printing mode to generate the multi-value image data 142 (CMYK) for the first scan and multi-value image data 143 (CMYK) for the second scan for each pixel from the input image data 141 (RGB data). Here, in order to achieve a dot overlap rate suitable for the printing mode, the color conversion/image data division unit 62 selects an LUT prepared for each printing mode to use for the conversion. Based on this, referring again to Table 1, in the plain paper "fine" mode, the multi-value image data (142 and 143) are generated so that the bias of the two multi-value image data becomes relatively large. On the other hand, in the inkjet dedicated paper "standard" mode, the multi-value image data (142 and 143) are generated so that the bias of the two multi-value image data becomes relatively small. Note that processing after this (gradation correction processing, quantization processing, mask processing) is performed independently and simultaneously for each CMYK color, so that for the convenience of explanation, the processing will be explained for only one color (K), and explanations for the other colors will be omitted below.

The multi-value image data (142) for the first scan that are obtained as described above are inputted to the quantization processing unit 65-1 in FIG. 3, where they undergo error-diffusion processing and are converted to the quantized data (144) for the first scan. On the other hand, the multi-image data (143) for the second scan are inputted to the second quantization processing unit 65-2 where they undergo error-diffusion processing and are converted to the quantized data (145) for the second scan. At this time, when performing the error-diffusion processing on the multi-value image data 142 for the first scan, the error-diffusion matrix A illustrated in FIG. 9A is used, whereas when performing the error-diffusion processing on the multi-value image data 143 for the second scan, the error-diffusion matrix B illustrated in FIG. 9B is used. In the diagram, out of the quantized data (144, 145) for the first scan and second scan, data corresponding to "1" are data for which a dot will be printed (ink will be ejected), and data corresponding to "0" are data for which a dot will not be printed (ink will not be ejected).

Subsequently, by dividing the quantized data 144 for the first scan with a mask, the first scan binary data division processing unit 67-1 generates the quantized data 146 for the first scan that corresponds to the first nozzle array and the quantized data 147 for the first scan that correspond to the second nozzle array. More specifically, by thinning the quantized data 144 for the first scan with the mask 1801 in FIG. 5, the quantized data 146 for the first scan that correspond to the first nozzle array are obtained. Also, by thinning the quantized data 144 for the first scan with the mask 1802, the quantized data 147 for the first scan that correspond to the second nozzle array are obtained. The same holds true for the second scan binary data division processing unit 67-2.

In the present embodiment, binary data for the same scan corresponding to the two nozzle arrays are generated using the two masks having a complementary relationship, and therefore dot overlap does not occur between the nozzle arrays. Of course, it is possible to cause the dot overlap to occur between the nozzle arrays as well as between the scans, however; if the color conversion/image data division unit generates multi-value data for a plurality of nozzle arrays×a plurality of scans, the number of data that becomes the object of the quantization processing increases, and thus the data processing load becomes high. In addition, the printing position shift between the nozzles is less than that between the scans, so that even though control of the dot overlap rate is not applied between the nozzle arrays, it is difficult for the problem of density fluctuation to become obvious. For this reason, in the present embodiment, multi-value data are generated for only the number of multipasses, and the dots are distributed between the nozzle arrays by using the masks having a complementary relationship.

As explained above, according to the present embodiment, in order to achieve a dot overlap rate that is appropriate for the printing mode, a plurality of density data that corresponds to different scans is generated according to the distribution rate corresponding to the printing mode, and after that, the binarization processing is performed for each of the multi-value data. By doing so, it is possible to set a dot overlap rate in the printing mode where graininess or density shortage stands out more than density unevenness due to the printing position shift being lower than the dot overlap rate in the printing mode where the density unevenness due to the printing position shift stands out more than the graininess or density shortage. In other words, by making the dot overlap rate different between the printing mode where the density unevenness stands out more than the graininess or density shortage and the printing mode where the graininess or density shortage is taken into consideration more than the density unevenness, it is possible to output a good image even in any printing mode.

Second Embodiment

In the first embodiment, the method was explained in which, in order to control the dot overlap rate, the color conversion/image data division unit adjusted the distribution rate. In the present embodiment, the dot overlap rate is controlled by characterizing the quantization processing that is performed when quantizing the plurality of multi-value density data generated by the color conversion/image data division unit. At this time, a method of controlling the dot overlap rate on the basis of the collaboration between the color conversion/image data division unit and the quantization processing unit may be employed.

Figure 16:
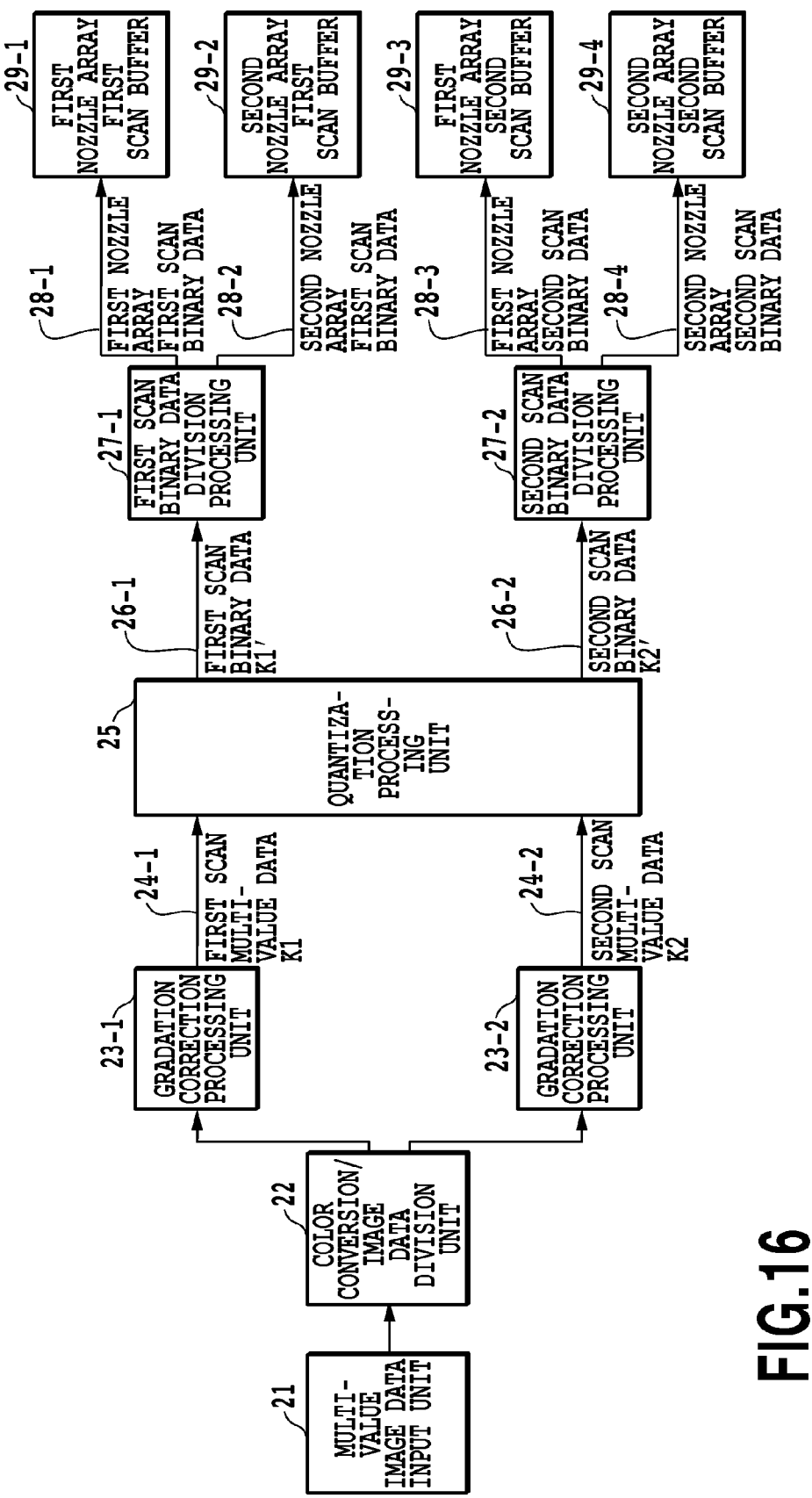
FIG. 16 is a block diagram for explaining steps of image processing of the second embodiment.

FIG. 16 is a block diagram for explaining the image processing that is performed when performing multipass printing to complete an image in the same area on a printing medium using two scans as illustrated in FIG. 7. Here, the processing steps from 21 to 25 in the diagram are performed by the control unit 3000 explained using FIG. 2 on image data that is inputted from an image input device such as the digital camera 3012, and processing steps from 27 are performed by the printer engine 3009. As described, the control unit 3000 is provided with the following: a multi-value image data input unit 21, a color conversion/image data division unit 22, gradation correction processing units (23-1, 23-2), and a quantization processing unit 25 illustrated in FIG. 16. On the other hand, the printer engine 3004 is provided with binary data division processing units (27-1, 27-2).

Multi-value RGB image data (256 values) are inputted from an external device via the multi-value image data input unit 21. The inputted image data are then inputted to the color conversion/image data division unit 22 where multi-value data for the first scan and multi-value data for the second scan are generated at once, which then undergo gradation correction in the gradation correction processing units 23-1 and 23-2. By doing this, multi-value data 24-1 for the first scan and multi-value data 24-2 for the second scan are obtained. When doing this, the distribution rate may be even, or similar to the above embodiment, a plurality of multi-value density data (CMYK) corresponding to different scans may be generated according to the distribution rate corresponding to a printing mode.

After that, the gradation correction processing units 23-1 and 23-2 perform the same gradation correction processing as in the first embodiment. As a result, the multi-value data 24-1 (C1, M1, Y1, K1) for the first scan and the multi-value data 24-2 (C2, M2, Y2, K2) for the second scan are obtained. Subsequent processing is performed independently and simultaneously for cyan (C), magenta (M), yellow (Y), and black (K), and therefore explanation below will be provided just for black (K).

The quantization processing unit 25 performs binarization processing (quantization processing) on both the multi-value data 24-1 (K1) for the first scan and the multi-value data 24-2 (K2) for the second scan. That is, each of the multi-value data is converted (quantized) to either 0 or 1 to become binary data K1' (26-1) for the first scan or binary data K2' (26-2) for the second scan. When doing this, dots are overlapped and printed in pixels for which both K1' and K2' are 1, and no dot is printed in pixels for which both K1' and K2' are 0. Moreover, only one dot is printed in pixels for which only one of K1' and K2' is 1.

In the present embodiment, a plurality of threshold value tables that are used for quantization are prepared in advance as illustrated in FIGS. 17A to 17G, and the quantization processing unit 25 sets one threshold value table among the plurality of threshold value tables according to the parameter that was set in the memory 3003. In addition, the quantization processing unit 25 uses the threshold value table that was set in this way to set a threshold value to be used for each individual pixel, and performs the quantization using the value.

Figure 11:
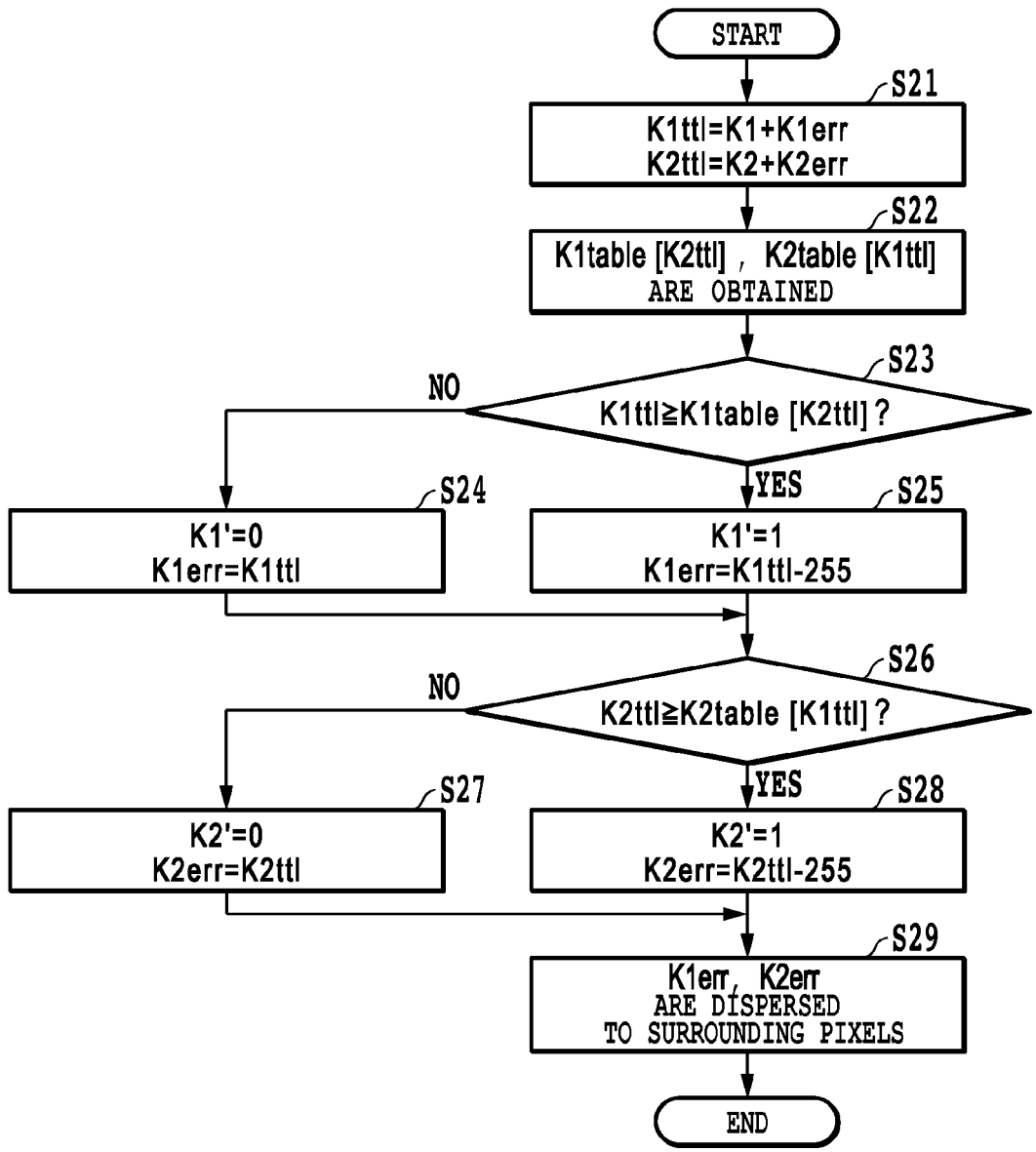
FIG. 11 is a flowchart for explaining the quantization method of a second embodiment.

Processing steps performed by the quantization processing unit 25 will be explained using the flowchart in FIG. 11. In the flowchart, K1 and K2 are inputted multi-value data for a pixel in question, and have values 0 to 255. Also, K1err and K2err are accumulated error values that are generated from surrounding pixels for which quantization processing has already been performed, and K1ttl and K2ttl are total values of the inputted multi-value data and accumulated error values. Further, K1' and K2' are binary quantized data for the first printing scan and second printing scan.

In the processing steps, threshold values (quantized parameters) that are used when setting the binary quantized data values K1' and K2' differ according to the values K1ttl and K2ttl. Therefore, tables are prepared in advance from which the threshold values are primarily set according to the values K1ttl and K2ttl. Here, when setting the value K1', the threshold value for comparison with K1ttl is K1table [K2ttl], and when setting the value K2', the threshold value for comparison with K2ttl is K2table [K1ttl]. K1table [K2ttl] is a value that is set from the value K2ttl, and K2table [K1ttl] is a value that is set from the value K1ttl.

When the processing steps are started, first, in step S21, K1ttl and K2ttl are calculated. Then, in step S22, the two threshold values K1table [K2ttl] and K2table [K1ttl] are obtained from the values K1ttl and K2ttl obtained in step S21 by referencing the threshold value table that was set according to the parameter. The threshold value K1table [K2ttl] is primarily set by using K2ttl as a "reference value" in the threshold value table of Table 3. On the other hand, the threshold value K2table [K1ttl] is primarily set by using K1ttl as a "reference value" in the threshold value table of Table 3.

In subsequent steps S23 to S25, the value K1' is determined, and in S26 to S28, K2' is determined. More specifically, in S23, whether or not K1ttl calculated in S21 is equal to or greater than the threshold value K1table [K2ttl] obtained in S22 is determined. When it is determined that K1ttl is equal to or greater than the threshold value, K1'=1 is set, and the accumulated error value K1err is calculated according to this output value (K1'=1) and updated (S25). On the other hand, if it is determined that K1ttl is less than the threshold value, K1'=0 is set, and the accumulated error value K1err is calculated according to this output value (K1'=0) and updated (S24).

Subsequently, in S26, whether or not K2ttl calculated in S21 is equal to or greater than the threshold value K2table [K1ttl] obtained in S22 is determined. If it is determined that K2ttl is equal to or greater than the threshold value, K2'=1 is set, and the accumulated error value K2err is calculated according to this output value (K1'=1) and updated (S28). On the other hand, if it is determined that K2ttl is less than the threshold value, K2'=0 is set, and the accumulated error value K2err is calculated according to this output value (K2'=0) and updated (S27).

After that, in S29, the accumulated error values K1err and K2err that were updated as described above are diffused according to the error-diffusion matrix illustrated in FIGS. 9A and 9B into surrounding pixels for which the quantization processing has not yet been performed. In the present embodiment, the error-diffusion matrix illustrated in FIG. 9A is used for diffusing the accumulated error value K1err into the surrounding pixels, and the error-diffusion matrix illustrated in FIG. 9B is used for diffusing the accumulated error value K2err into the surrounding pixels.

As described, in the present embodiment, the threshold value (quantized parameter) that is used for performing the quantization processing on the multi-value data (K1ttl) corresponding to the first scan is determined based on the multi-value data (K2ttl) corresponding to the second scan. Similarly, the threshold value (quantized parameter) that is used for performing the quantization processing on the multi-value data (K2ttl) corresponding to the second scan is determined based on the multi-value data (K1ttl) corresponding to the first scan. In other words, the quantization processing of multi-value data that corresponds to one scan of the two scans and the quantization processing of multi-value data that corresponds to the other scan of the two scans are performed based on both the multi-value data that corresponds to the one scan and the multi-value data that corresponds to the other scan. By doing so, for example, it is possible to perform control such that, in pixels for which dots were printed during the one scan, dots are not printed during the other scan, and therefore it is possible to suppress graininess worsening or density shortage due to dot overlap.

FIG. 17A is a diagram for explaining the correlation between the results for, according to the flowchart in FIG. 11, performing the quantization processing (binarization processing) using threshold values that are given in the column for FIG. 17A in the threshold value table of Table 3 below and the inputted values (K1ttl and K2ttl). K1ttl and K2ttl both take on a value 0 to 255, and printing (1) and no printing (0) are set with the threshold value 128 as a border such as illustrated in the column for FIG. 17A in the threshold value table. The point 221 in the diagram is the boundary point between the area where absolutely no dot is printed (K1'=0 and K2'=0) and the area where two dots overlap (K1'=1 and K2'=1).

FIG. 17B is a diagram for explaining the correlation between the results for, according to the flowchart in FIG. 11, performing the quantization processing (binarization processing) using threshold values that are given in the column for FIG. 17B in the threshold value table of Table 3 below and the inputted values (K1ttl and K2ttl). The point 231 is the boundary between the area where absolutely no dot is printed (K1'=0 and K2'=0) and the area where only one dot is printed (K1'=1 and K2'=0, or K1'=0 and K2'=1). The point 232 is the boundary between the area where two dots overlap and are printed (K1'=1 and K2'=1) and the area where only one dot is printed (K1'=1 and K2'=0, or K1'=0 and K2'=1). By separating the points 231 and 232 from each other by a certain distance, as compared with the case shown in FIG. 17A, the area where only one dot is printed increases, and the area where two dots are printed decreases. In other words, the case illustrated in FIG. 17B is effective in reducing the dot overlap rate more and keeping graininess lower than in the case illustrated in FIG. 17A. When there is a point such as in FIG. 17A where the dot overlap rate suddenly changes, density unevenness may occur due to small changes in gradation; however, in the case illustrated in FIG. 17B, the dot overlap rate changes gradually as the gradation changes, and therefore such a kind of density unevenness is unlikely to occur.

In the quantization processing of the present embodiment, by setting various conditions for the relationships between the values K1ttl and K2ttl and the values K1 and K2, it is possible to make various adjustments of the values K1' and K2' and thus the dot overlap rate. In the following, some examples will be explained using FIGS. 17C to 17G. Note that as in the cases of FIG. 17A and FIG. 17B described above, FIGS. 17C to 17G are diagrams that illustrate the correlation between the quantization results (K1' and K2') using threshold values that are given in the threshold value table of Table 3 below and the inputted values (K1ttl and K2ttl).

FIG. 17C is a diagram illustrating the case where the dot overlap rate is set to a value between the values in FIG. 17A and FIG. 17B. The point 241 is set at the mid point between the point 221 in FIG. 17A and the point 231 in FIG. 17B. Also, the point 242 is set at the mid point between the point 221 in FIG. 17A and the point 232 in FIG. 17B.

FIG. 17D is a diagram illustrating the case where the dot overlap rate is decreased even more than in the case illustrated in FIG. 17B. The point 251 is set at a point that externally divides the point 221 in FIG. 17A and the point 231 in FIG. 17B by 3:2. Moreover, the point 252 is set at a point that externally divides the point 221 in FIG. 17A and the point 232 in FIG. 17B by 3:2.

FIG. 17E illustrates the case where the dot overlap rate is increased more than that for the case of FIG. 17A. In the case illustrated in FIG. 17E, the transition from the area where no dot is printed (K1'=0 and K2'=0) to the area where two dots overlap and are printed (K1'=1 and K2'=1) occurs easily, and therefore it is possible to increase the dot overlap rate. FIG. 17F is a diagram that illustrates the case where the dot overlap rate has a value between those for the case illustrated in FIG. 17A and the case illustrated in FIG. 17E. FIG. 17G illustrates the case where the dot overlap rate is further increased more than the case illustrated in FIG. 17E.

Next, a method for the quantization processing that uses the threshold value table illustrated in Table 3 below will be explained in detail. Table 3 is the threshold value table for achieving the processing results illustrated in FIGS. 17A to 17G, and referenced in S22 of the flowchart explained using FIG. 11.

Here, the case will be explained where the inputted values (K1ttl, K2ttl) are (100, 120), and the threshold values that are given in the column for FIG. 18B of the threshold value table are used. First, in S22 of FIG. 11, the threshold value K1table [K2ttl] is obtained based on the threshold value table illustrated in Table 3 and K2ttl (reference value). When the reference value (K2ttl) is '120', the threshold value K1table [K2ttl] becomes '120'. Similarly, the threshold value K2table [K1ttl] is obtained based on the threshold value table and K1ttl (reference value). When the reference value (K1ttl) is '100', the threshold value K2table [K1ttl] becomes '101'. Then, in S23 of FIG. 11, K1ttl is compared with the threshold value K1table [K2ttl], and in this case, K1ttl (=100)<threshold value K1table [K2ttl] (=120), resulting in K1'=0 (S24). Similarly, in S26 of FIG. 11, K2ttl is compared with the threshold value K2table [K1ttl], and in this case, K2ttl (=120)≧threshold value K2table [K1ttl] (=101), resulting in K2'=1 (S28). As a result, as illustrated in FIG. 17B, when (K1ttl, K2ttl)=(100, 120), (K1', K2')=(0, 1).

According to the quantization processing as described above, the dot overlap rate is controlled between two scans by quantizing the multi-value data that correspond to the two scans based on both of the multi-value data corresponding to the two scans. By doing so, the overlap rate of the dots printed in one scan and the dots printed in the other scan can be kept within a preferable range, and therefore it is possible to achieve both suppressed density unevenness and low graininess. Note that, in Table 3, the reference values are given in increments of 4, however; in an actual table, threshold values are also prepared for the values (for example, 1 to 3) between these values as well. However, for the reference values, skipping values as illustrated in Table 3 may be prepared, and for conversion of other values, values may be obtained by performing interpolation from the closest reference values to the values.

Here, is the case of arranging the threshold value tables for FIGS. 17A to 17G in the ascending order of dot overlap rate: FIG. 17D, FIG. 17B, FIG. 17C, FIG. 17A, FIG. 17F, FIG. 17E, and FIG. 17G. Therefore, in the present embodiment, in the case of the plain paper "fine" mode, the threshold table for FIG. 17D is used, and in the case of the inkjet dedicated paper "standard" mode, the threshold table for FIG. 17E may be used. By doing so, the dot overlap rate in the plain paper "fine" mode can be kept lower than that in the inkjet dedicated paper "standard" mode.

TABLE 3

| | FIG. 17A | | FIG. 17B | | FIG. 17C | | FIG. 17D | | FIG. 17E | | FIG. 17F | | FIG. 17G | |
|---|---|---|---|---|---|---|---|---|---|---|---|---|---|---|
| ref. | K1 table | K2 table | K1 table | K2 table | K1 table | K2 table | K1 table | K2 table | K1 table | K2 table | K1 table | K2 table | K1 table | K2 table |
| 0 | 128 | 128 | 128 | 128 | 128 | 128 | 128 | 128 | 127 | 127 | 127 | 127 | 127 | 127 |
| 4 | 128 | 128 | 124 | 124 | 126 | 126 | 116 | 116 | 131 | 131 | 129 | 129 | 139 | 139 |
| 8 | 128 | 128 | 120 | 120 | 125 | 125 | 104 | 104 | 135 | 135 | 130 | 130 | 151 | 151 |
| 12 | 128 | 128 | 116 | 116 | 124 | 124 | 92 | 92 | 139 | 139 | 131 | 131 | 163 | 163 |
| 16 | 128 | 128 | 112 | 112 | 122 | 122 | 80 | 80 | 143 | 143 | 133 | 133 | 175 | 175 |
| 20 | 128 | 128 | 108 | 108 | 121 | 121 | 68 | 68 | 147 | 147 | 134 | 134 | 187 | 187 |
| 24 | 128 | 128 | 104 | 104 | 120 | 120 | 56 | 56 | 151 | 151 | 135 | 135 | 199 | 199 |
| 28 | 128 | 128 | 100 | 100 | 118 | 118 | 44 | 44 | 155 | 155 | 137 | 137 | 211 | 211 |
| 32 | 128 | 128 | 96 | 96 | 117 | 117 | 32 | 33 | 159 | 159 | 138 | 138 | 223 | 222 |
| 36 | 128 | 128 | 92 | 92 | 116 | 116 | 36 | 37 | 163 | 163 | 139 | 139 | 219 | 218 |
| 40 | 128 | 128 | 88 | 88 | 114 | 114 | 40 | 41 | 167 | 167 | 141 | 141 | 215 | 214 |
| 44 | 128 | 128 | 84 | 84 | 113 | 113 | 44 | 45 | 171 | 171 | 142 | 142 | 211 | 210 |
| 48 | 128 | 128 | 80 | 80 | 112 | 112 | 48 | 49 | 175 | 175 | 143 | 143 | 207 | 206 |
| 52 | 128 | 128 | 76 | 76 | 110 | 110 | 52 | 53 | 179 | 179 | 145 | 145 | 203 | 202 |
| 56 | 128 | 128 | 72 | 72 | 109 | 109 | 56 | 57 | 183 | 183 | 146 | 146 | 199 | 198 |
| 60 | 128 | 128 | 68 | 68 | 108 | 108 | 60 | 61 | 187 | 187 | 147 | 147 | 195 | 194 |
| 64 | 128 | 128 | 64 | 65 | 106 | 106 | 64 | 65 | 191 | 190 | 149 | 149 | 191 | 190 |
| 68 | 128 | 128 | 68 | 69 | 105 | 105 | 68 | 69 | 187 | 186 | 150 | 150 | 187 | 186 |
| 72 | 128 | 128 | 72 | 73 | 104 | 104 | 72 | 73 | 183 | 182 | 151 | 151 | 183 | 182 |
| 76 | 128 | 128 | 76 | 77 | 102 | 102 | 76 | 77 | 179 | 178 | 153 | 153 | 179 | 178 |
| 80 | 128 | 128 | 80 | 81 | 101 | 101 | 80 | 81 | 175 | 174 | 154 | 154 | 175 | 174 |
| 84 | 128 | 128 | 84 | 85 | 100 | 100 | 84 | 85 | 171 | 170 | 155 | 155 | 171 | 170 |
| 88 | 128 | 128 | 88 | 89 | 98 | 98 | 88 | 89 | 167 | 166 | 157 | 157 | 167 | 166 |
| 92 | 128 | 128 | 92 | 93 | 97 | 97 | 92 | 93 | 163 | 162 | 158 | 158 | 163 | 162 |
| 96 | 128 | 128 | 96 | 97 | 96 | 97 | 96 | 97 | 159 | 158 | 169 | 158 | 150 | 158 |
| 100 | 128 | 128 | 100 | 101 | 100 | 101 | 100 | 101 | 155 | 154 | 155 | 154 | 155 | 154 |
| 104 | 128 | 128 | 104 | 105 | 104 | 105 | 104 | 105 | 151 | 150 | 151 | 150 | 151 | 150 |
| 108 | 128 | 128 | 108 | 109 | 108 | 109 | 108 | 109 | 147 | 146 | 147 | 146 | 147 | 146 |
| 112 | 128 | 128 | 112 | 113 | 112 | 113 | 112 | 113 | 143 | 142 | 143 | 142 | 143 | 142 |
| 116 | 128 | 128 | 116 | 117 | 116 | 117 | 116 | 117 | 139 | 138 | 139 | 138 | 139 | 138 |

TABLE 3-continued

| | FIG. 17A | | FIG. 17B | | FIG. 17C | | FIG. 17D | | FIG. 17E | | FIG. 17F | | FIG. 17G | |
|---|---|---|---|---|---|---|---|---|---|---|---|---|---|---|
| ref. | K1 table | K2 table | K1 table | K2 table | K1 table | K2 table | K1 table | K2 table | K1 table | K2 table | K1 table | K2 table | K1 table | K2 table |
| 120 | 128 | 128 | 120 | 121 | 120 | 121 | 120 | 121 | 135 | 134 | 135 | 134 | 135 | 134 |
| 124 | 128 | 128 | 124 | 125 | 124 | 125 | 124 | 125 | 131 | 130 | 131 | 130 | 131 | 130 |
| 128 | 128 | 128 | 128 | 129 | 128 | 129 | 128 | 129 | 127 | 126 | 127 | 126 | 127 | 126 |
| 132 | 128 | 128 | 132 | 133 | 132 | 133 | 132 | 133 | 123 | 122 | 123 | 122 | 123 | 122 |
| 136 | 128 | 128 | 136 | 137 | 136 | 137 | 136 | 137 | 119 | 118 | 119 | 118 | 119 | 118 |
| 140 | 128 | 128 | 140 | 141 | 140 | 141 | 140 | 141 | 115 | 114 | 115 | 114 | 115 | 114 |
| 144 | 128 | 128 | 144 | 145 | 144 | 145 | 144 | 145 | 111 | 110 | 111 | 110 | 111 | 110 |
| 148 | 128 | 128 | 148 | 149 | 148 | 149 | 148 | 149 | 107 | 106 | 107 | 106 | 107 | 106 |
| 152 | 128 | 128 | 152 | 153 | 152 | 153 | 152 | 153 | 103 | 102 | 103 | 102 | 103 | 102 |
| 156 | 128 | 128 | 156 | 157 | 156 | 157 | 156 | 157 | 99 | 98 | 99 | 98 | 99 | 98 |
| 160 | 128 | 128 | 160 | 161 | 157 | 158 | 160 | 161 | 95 | 94 | 97 | 97 | 94 | 95 |
| 164 | 128 | 128 | 164 | 165 | 159 | 159 | 164 | 165 | 91 | 90 | 96 | 96 | 91 | 90 |
| 168 | 128 | 128 | 168 | 169 | 157 | 157 | 168 | 169 | 87 | 86 | 98 | 98 | 87 | 86 |
| 172 | 128 | 128 | 172 | 173 | 156 | 156 | 172 | 173 | 83 | 82 | 99 | 99 | 83 | 82 |
| 176 | 128 | 128 | 176 | 177 | 155 | 155 | 176 | 177 | 79 | 78 | 100 | 100 | 79 | 78 |
| 180 | 128 | 128 | 180 | 181 | 153 | 153 | 180 | 181 | 75 | 74 | 102 | 102 | 75 | 74 |
| 184 | 128 | 128 | 184 | 185 | 152 | 152 | 184 | 185 | 71 | 70 | 103 | 103 | 71 | 70 |
| 188 | 128 | 128 | 188 | 189 | 151 | 151 | 188 | 189 | 67 | 66 | 104 | 104 | 67 | 66 |
| 192 | 128 | 128 | 191 | 191 | 149 | 149 | 192 | 193 | 64 | 64 | 106 | 106 | 63 | 62 |
| 196 | 128 | 128 | 187 | 187 | 148 | 148 | 196 | 197 | 68 | 68 | 107 | 107 | 59 | 58 |
| 200 | 128 | 128 | 183 | 183 | 147 | 147 | 200 | 201 | 72 | 72 | 108 | 108 | 55 | 54 |
| 204 | 128 | 128 | 179 | 179 | 145 | 145 | 204 | 205 | 76 | 76 | 110 | 110 | 51 | 50 |
| 208 | 128 | 128 | 175 | 175 | 144 | 144 | 208 | 209 | 80 | 80 | 111 | 111 | 47 | 46 |
| 212 | 128 | 128 | 171 | 171 | 143 | 143 | 212 | 213 | 84 | 84 | 112 | 112 | 43 | 42 |
| 216 | 128 | 128 | 167 | 167 | 141 | 141 | 216 | 217 | 88 | 88 | 114 | 114 | 39 | 38 |
| 220 | 128 | 128 | 163 | 163 | 140 | 140 | 220 | 221 | 92 | 92 | 115 | 115 | 35 | 34 |
| 224 | 128 | 128 | 159 | 159 | 139 | 139 | 222 | 222 | 96 | 96 | 116 | 116 | 33 | 33 |
| 228 | 128 | 128 | 155 | 155 | 137 | 137 | 210 | 210 | 100 | 100 | 118 | 118 | 45 | 45 |
| 232 | 128 | 128 | 151 | 151 | 136 | 136 | 198 | 198 | 104 | 104 | 119 | 119 | 57 | 57 |
| 236 | 128 | 128 | 147 | 147 | 135 | 135 | 186 | 186 | 108 | 108 | 120 | 120 | 69 | 69 |
| 240 | 128 | 128 | 143 | 143 | 133 | 133 | 174 | 174 | 112 | 112 | 122 | 122 | 81 | 81 |
| 244 | 128 | 128 | 139 | 139 | 132 | 132 | 162 | 162 | 116 | 116 | 123 | 123 | 93 | 93 |
| 248 | 128 | 128 | 135 | 135 | 131 | 131 | 150 | 150 | 120 | 120 | 124 | 124 | 105 | 105 |
| 252 | 128 | 128 | 131 | 131 | 129 | 129 | 138 | 138 | 124 | 124 | 126 | 126 | 117 | 117 |
| 255 | 128 | 128 | 128 | 128 | 129 | 129 | 129 | 129 | 127 | 127 | 126 | 126 | 126 | 126 |

Returning again to FIG. 16, after obtaining the binary image data K1' and K2' for achieving the desired dot overlap rate as described above by the quantization processing unit 25, these data are sent via the IEEE 1284 bus 3022 to the printer engine 3004 illustrated in FIG. 2. The processing after that is performed by the printer engine 3004.

In the printer engine 3004, the binary image data K1' (26-1) and K2' (26-2) are divided into binary data to be printed by the two nozzle arrays 54 and 55, respectively. In other words, the binary image data for the first scan K1' (26-1) are divided by the first scan binary data division processing unit 27-1 into binary data 28-1 for the first scan by the first nozzle array and binary data 28-2 for the first scan by the second nozzle array. Also, the binary image data K2' (26-2) for the second scan are divided by the second scan binary data division unit 27-2 into binary data 28-3 for the second scan by the first nozzle array and binary data 28-4 for the second scan by the second nozzle array. The method for dividing them is the same as in the first embodiment. After that, each of the binary image data (28-1 to 4) is stored in a buffer that is prepared for each corresponding scan by a corresponding nozzle array. After the necessary amount of binary image data is stored in each buffer, the printing operation is performed according to the stored data by a corresponding scan and nozzle array.

Note that, even in the present embodiment, as in the first embodiment, it is possible to apply dot overlap rate control not only between the scans, but also between the nozzle arrays. However, when applying the dot overlap rate control between the nozzle arrays as well, the number of data that is to undergo the quantization increases, and therefore the data processing load becomes large. Therefore, the present embodiment is adaptable to the dot overlap control only between the scans, but not to the dot overlap control between the nozzle arrays.

In the above, the 2-pass printing is taken as an example; however, in an actual print apparatus, normally a plurality of printing modes having different multipass numbers are prepared, and in the present embodiment as well, it is possible to achieve the desired dot overlap rate by various multipasses. In other words, in the present embodiment, the above method for controlling the dot overlap rate can be applied to M (M is an integer 2 or greater) pass printing corresponding to 3-pass or more. That is, referring again to Table 1, for the inkjet dedicated paper "fine" mode, by preparing a dedicated threshold table, a desired dot overlap rate can be achieved.

In the case of M-pass printing, the number of multi-value density data that is generated by the color conversion/image data division unit 22 in FIG. 16 is M. That is, by referencing the 3-dimensional LOT that correlates the inputted image data (RGB) with multi-value density data that correspond to M passes, the multi-value image data are generated at once from the inputted image data. Together with that, the quantization processing unit 25 obtains threshold values by referencing a prepared threshold value table using first multi-value data to M-th multi-value data as reference values for each of M pieces of multi-value data, or in other words, first multi-value data to M-th multi-value data. Then, the obtained threshold values are used to perform the quantization processing, and the M pieces of binary data are outputted.

As explained above, according to the present embodiment, a plurality of density data that corresponds to the multipass number is generated, and after that, in order to obtain the dot overlap rate for each density data that corresponds to each printing mode, suitable threshold values are set and binarization processing is performed. By doing so, it is possible to set the dot overlap rate on plain paper in which density shortage is taken into consideration more than density unevenness due to the printing position shift such that it is lower than the dot overlap rate on coated paper in which the density unevenness due to the printing position shift is likely to stand out more than the graininess or density shortage. In other words, by making the dot overlap rate different between the printing mode in which the density unevenness is likely to stand out more than graininess or density shortage, and the printing mode in which the graininess or density shortage is taken into consideration more than the density unevenness, it is possible to output good images even in any printing mode.

(Variation of Second Embodiment)

The quantization method for achieving the desired dot overlap rate is not limited to that described above. It is not absolutely necessary to set printing (1) and no printing (0) through comparison with threshold values. For example, in the case of two planes, a 2-dimensional table could also be prepared in which K1' and K2' are primarily set to printing (1) or no printing (0) by using both K1ttl and K2ttl as reference values. Moreover, in the case of three planes, a 3-dimensional table could also be prepared in which K1', K2' and K3' are primarily set by using K1ttl, K2ttl and K3ttl as reference values, respectively.

Details about the tables are omitted; however, using multi-dimensional tables such as these has merit in that control becomes simpler, and the dot overlap rate can be controlled with a high degree of freedom. On the other hand, using a 1-dimensional threshold value table as illustrated in Table 3 has merit in that the table can be stored in less memory space.

Further, it is also possible to perform binarization (quantization) processing by just branching and calculation without using any table. In that case, by setting coefficients used in the calculation to values that make it possible to achieve the desired dot overlap rate, the effect of the present embodiment can be obtained. In such a case, it is possible to further reduce the amount of memory space (used ROM size or RAM size) as compared with the case in which the table described above is prepared.

Third Embodiment

In recent years, most image processing is performed at a lower (rougher) resolution than the printing resolution, and after converting a form of the image data from 256-gradation multi-value image data to L-value (L is 3 or greater) multi-value data having a lower gradation than 256, the L-value image data is sent to the printer engine of a print apparatus. In this case, the printer engine has a dot pattern (index pattern) that is stored in memory for converting the received low-gradation L-value multi-value data to binary data that correspond to the printing resolution.

In the following, an example of 3-value quantization is explained as the L-value quantization; however, needless to say, the value of L can be any value that is greater than 3. Moreover, in the explanation below, as in the embodiments described above, the method for controlling the dot overlap rate will be explained for 2-pass multipass printing as an example; however, of course, the present embodiment, as well, can correspond to a plurality of printing modes having a multipass number other than 2.

Figure 18:
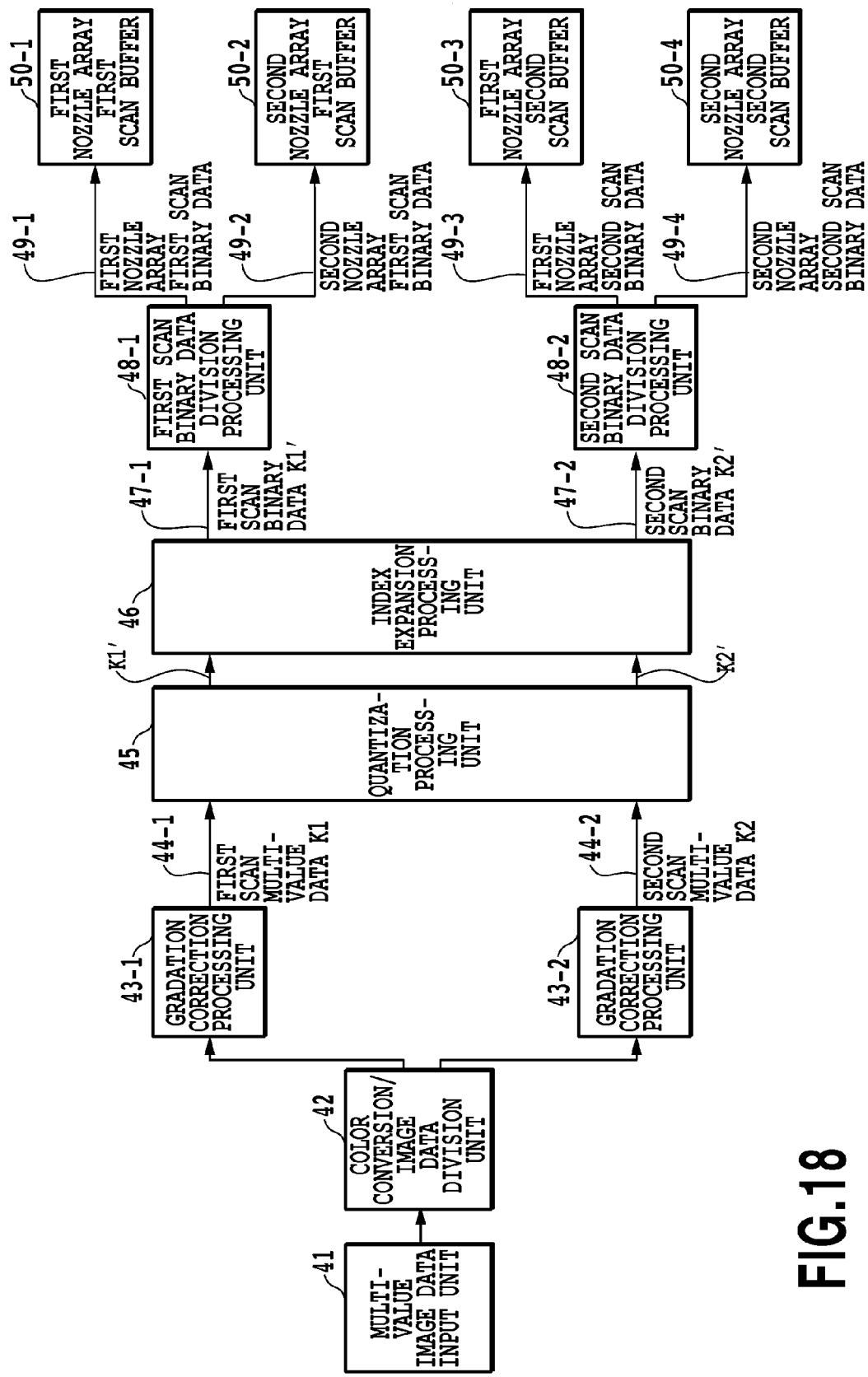
FIG. 18 is a block diagram for explaining steps of image processing of the third embodiment.

FIG. 18 is a block diagram for explaining image processing in the present embodiment for the case where multipass printing is performed to complete an image in the same area (for example, pixel area) by two printing scans. Processing steps from the multi-value image data input unit 41 to the gradation correction processing unit 43-1, 43-2 are mainly equivalent to the processing steps from the multi-value image data input unit to gradation correction processing unit illustrated in FIG. 3 or FIG. 16.

Multi-value data (K1) 44-1 for the first scan and multi-value data (K2) 44-2 for the second scan are inputted to the quantization processing unit 45. The quantization processing unit 45 quantizes the multi-value data (K1) for the first scan and multi-value data (K2) for the second scan to the three values 0 to 2, to generate quantized data (K1') for the first scan and quantized data (K2') for the second scan. More specifically, as in the quantization processing that is performed by the quantization processing unit 25 of the second embodiment, first, accumulated errors K1ttl and K2ttl around K1 and K2 are obtained. After that, threshold values that are used when quantizing the multi-value data (K1) for the first scan are determined based on K2ttl, and threshold values that are used when quantizing the multi-value data (K2) for the second scan are determined based on K1ttl. In addition, in the case of M-pass printing, threshold values that are used when quantizing the multi-value data (Ki) for the ith scan are determined based on K1ttl to K(i−1)ttl and K(i+1) to KMttl.

In the case of the present embodiment, the 3-value quantization is performed, so that two threshold values, that is, a first threshold value and a second threshold value that is greater than the first threshold value are used. Moreover, the output values are determined according to the size relationship between the total value of the input multi-value data and the accumulated error values for the pixel in question (total values: K1ttl and K2ttl), and the first and second threshold values. In other words, when the total value is equal to or greater than the second threshold value, the output value becomes "2"; when the total value is equal to or greater than the first threshold value and less than the second threshold value, the output value becomes "1"; and when the total value is less than the first threshold value, the output value becomes "0".

As described, the multi-value data (K1) for the first scan are quantized based on the threshold values determined based on K2ttl to obtain the quantized data (K1') for the first scan. Similarly, the multi-value data (K2) for the second scan are quantized based on the threshold values determined based on K1ttl to obtain the quantized data (K2') for the second scan. In the case of M-pass printing, the multi-value data (Ki) for the ith scan are quantized using threshold values that are determined based on K1ttl to K (i−1) ttl and K(i+1) to KMttl to obtain quantized data (Ki') for the ith scan. As a method for determining the first threshold value and second threshold value, first threshold value tables and second threshold value tables can be respectively determined by using the same reference values as in the example of binarization.

Figure 13:
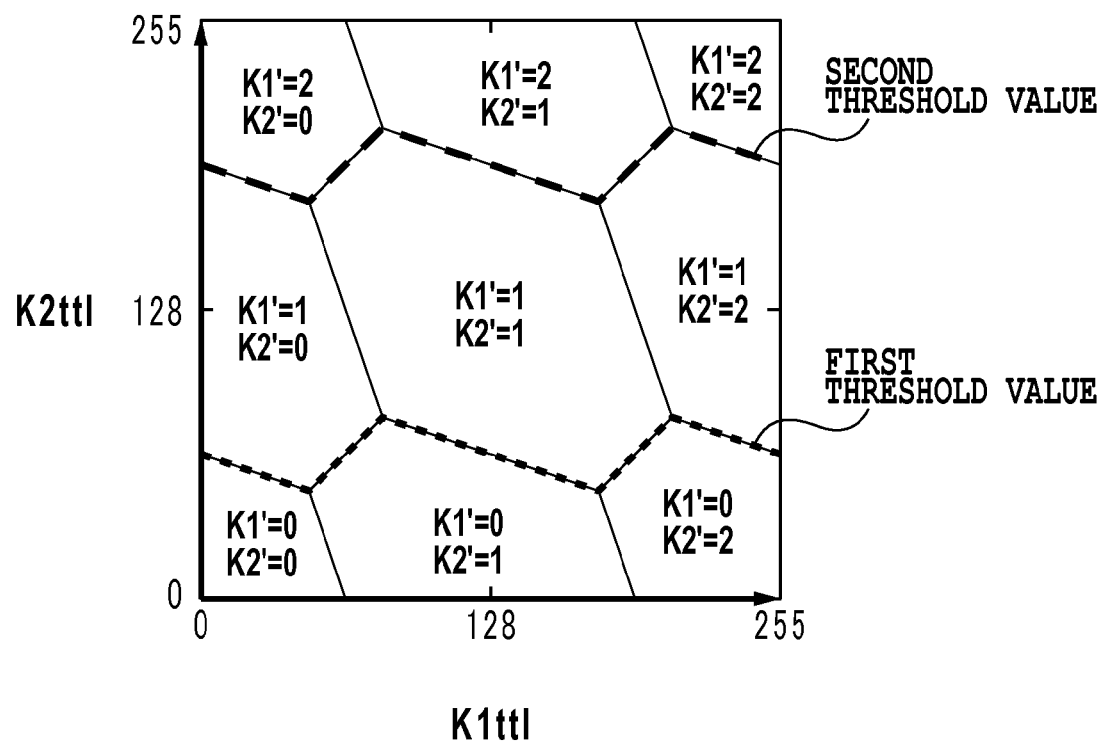
FIG. 13 is a diagram illustrating the correlation between 3-value quantization processing results and inputted values.
Figure 17:
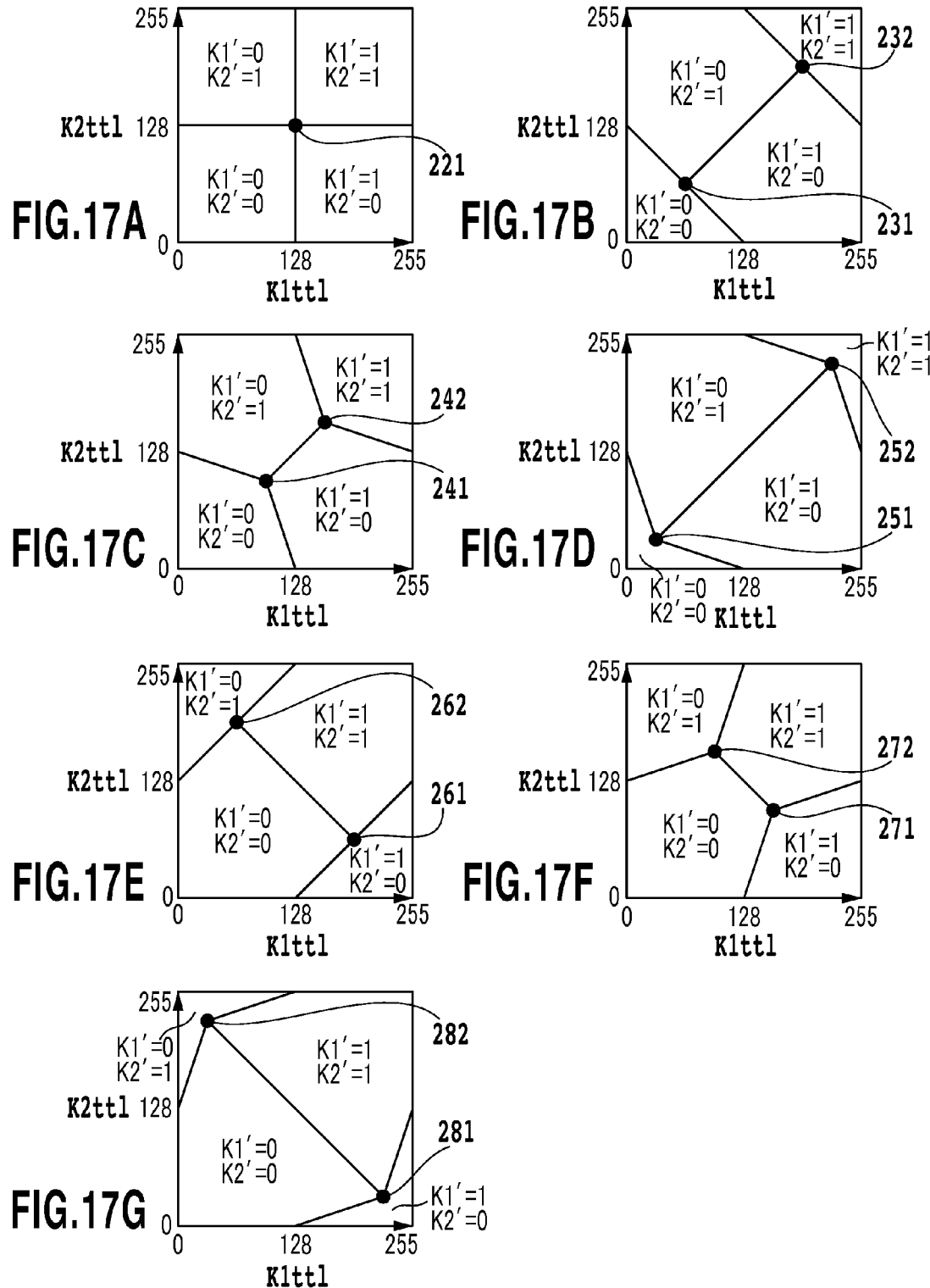
FIGS. 17A to 17G are diagrams illustrating the correspondence between the results and input values of quantization processing that uses the threshold value table of Table 3.

FIG. 13 is a diagram similar to FIG. 17 that illustrates the correlation between the quantization (3-value quantization) processing results (K1 and K2) by the quantization processing unit 45 and the inputted values (K1ttl and K2ttl). In the diagram, the values K1' and K2' respectively indicate the numbers of dots that will be printed in the pixel in question in the first printing scan and second printing scan. Here, the first threshold value that is used for quantizing K2ttl is indicated by the thick dotted line, and the second threshold value that is used for quantizing K2ttl is indicated by the thick dashed line.

For example, in the pixel in question where both K1' and K2' are 2, two dots each are printed in the first printing scan and second printing scan. Also, in the pixel in question where K1' is 1 and K2' is 2, one dot is printed in the first printing scan and two dots are printed in the second printing scan. Further, in the pixel in question where both K1' and K2' are 0, no dot is printed. FIG. 13 is a diagram that explains quantization in the case of 2-pass printing, and therefore illustrated in two dimensions with K1ttl and K2ttl being the coordinate axes; however, in the case of M-pass printing, the diagram is then illustrated in M dimensions with K1ttl to KMttl being the coordinate axes.

Referring again to FIG. 18, the 3-value image data (quantized data) K1' and K2' quantized in the quantization processing unit 45 are sent to the printer engine 3004, where index processing is performed in an index expansion processing unit 46. The index expansion processing is processing for binarizing L-value (L is an integer 3 or greater) quantized data, and therefore can be taken to be part of the quantization processing. The index expansion processing will be explained in detail later.

The index expansion processing unit 46 converts the 3-value image data K1' to binary image data 47-1 for the first scan, and converts the 3-value image data K2' to binary data 47-2 for the second scan. After that, the first scan binary data division unit 48-1 divides the binary image data 47-1 for the first scan into binary data 49-1 for the first scan by the first nozzle array and binary data 49-2 for the first scan by the second nozzle array. Similarly, the second scan binary data division unit 48-2 divides the binary image data 47-2 for the second scan into binary data 49-3 for the second scan by the first nozzle array and binary data 49-4 for the second scan by the second nozzle array. In the case of M-pass printing, an i-th scan binary data division unit 48-i divides binary image data for the i-th scan into binary data for the i-th scan by the first nozzle array and binary data for the i-th scan by the second nozzle array. This division processing is, in the same manner as in the first embodiment, performed by using masks. Moreover, these four kinds of binary data (49-1 to 4) are respectively stored in corresponding buffers (50-1 to 4). After that, when a specified amount of binary data has been stored in each individual buffer, the printing operation is performed according to the data stored in the corresponding buffers.

Figure 14:
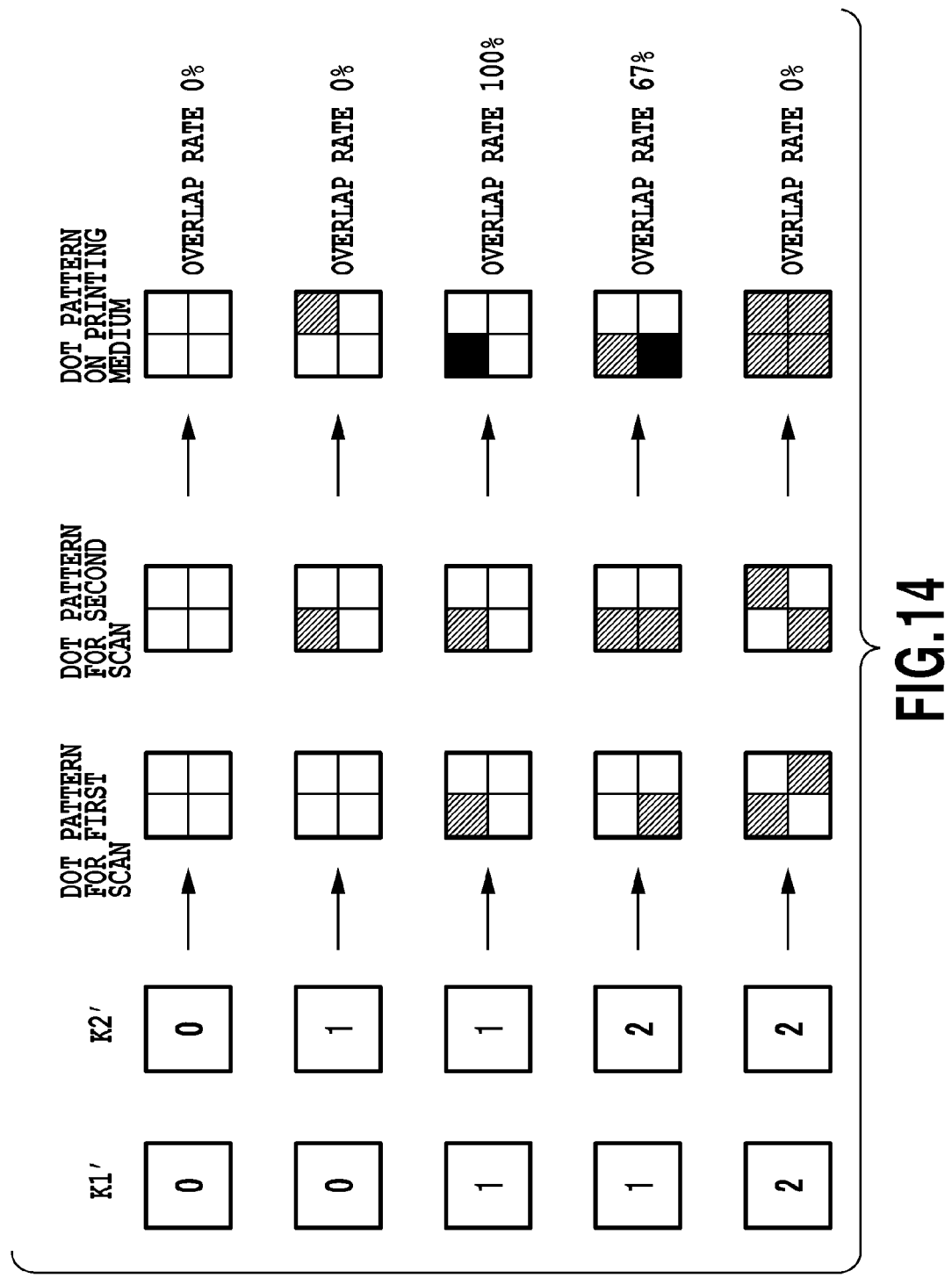
FIG. 14 is an explanatory diagram of the dot overlap rate when performing index expansion processing.

FIG. 14 is a diagram for explaining an example of the index expansion processing and index pattern (dot pattern). The index expansion processing unit 46 of the present embodiment converts 3-value image data (K1', K2') corresponding to 1 pixel to binary image data (dot pattern) corresponding to 2 sub pixels×2 sub pixels. More specifically, 3-value image data K1' having any value of 0 to 2 is converted to a dot pattern for the first scan. Similarly, 3-value image data K2' having any value of 0 to 2 is converted to a dot pattern for the second scan. In addition, a pattern that is obtained by combining the dot pattern for the first scan and the dot pattern for the second scan (illustrated furthest on the right side in the diagram, "dot pattern on the printing medium") is printed in the pixel. Note that, in regards to the dot patterns for the first and second scans, the diagonal line portions represent data that indicate printing (data that are "1") of dots in sub pixels, and white portions represent data that indicate no printing (data that are "0") of dot in sub pixels. In addition, in regards to dot patterns on the printing medium, black portions represent the printing of two dots in a sub pixel, diagonal line portions represent the printing of 1 dot in a sub pixel, and white portions represent no printing of dots in a sub pixel.

Here, the case where image processing is employed that converts 3-value or greater image data corresponding to a pixel to a binary dot pattern corresponding to m×n sub pixels will be explained in terms of dot overlap rate. In this case, the "dot overlap rate" is the ratio of the number of dots that overlap and are printed in the same sub pixel position in a pixel area by a different scan (or a different printing element group) with respect to the total number of dots to be printed in the one pixel area including a plurality of sub pixels. To explain this in more detail, referring to FIG. 14, when both K1' and K2' are 0, no dot is printed in either the first printing scan or second printing scan, and the dot overlap rate is 0. When one of K1' and K2' is 0 and the other is 1, a dot will be printed in only one scan, and therefore the dot overlap rate remains 0%. When both K1' and K2' are 1, two dots overlap and are printed in the upper left sub pixel of the 2 sub pixels×2 sub pixels, and therefore the dot overlap rate is 100% (=2÷100). Moreover, when one is 1 and the other is 2, two dots overlap and are printed in the lower left sub pixel of the 2 sub pixels×2 sub pixels, and only one dot is printed in the upper left sub pixel, so that the dot overlap rate is 67% (=2÷3×100). Further, when both K1' and K2' are 2, dots do not overlap in the sub pixels, and therefore the dot overlap rate is 0%. In other words, by preparing index patterns (dot patterns) in advance that correspond 1 to 1 with respective levels as illustrated in FIG. 14, combinations of K1' and K2' are set in the quantization processing as illustrated in FIG. 13, and therefore the dot overlap rates in the pixel area are also primarily set.

Next, the relationship between the dot overlap rate and the density area in the present embodiment will be explained using FIG. 14. In the example of FIG. 14, it is possible to print up to a maximum of four dots in one pixel. Therefore, a printing rate of 100% refers to a state where four dots are printed in one pixel. In the example of FIG. 14, when K1'=0 and K2'=0, the printing rate is 0%, when K1'=1 (or 0) and K2'=0 (or 1), the printing rate is 25%, and when K1'=1 and K2'=1, the printing rate is 50%. Moreover, when K1'=1 (or 2) and K2'=2 (or 1), the printing rate is 75%, and when K1'=2 and K2'=2, the printing rate is 100%. Furthermore, in low-density areas where the printing rate is 0% and 25%, the dot overlap rate is 0%; in medium-density areas where the printing rate is 50%, the dot overlap rate is 100%; and in high-density areas where the printing rate is 75% and 100%, the dot overlap rates are 67% and 0%, respectively. In this way, in the present embodiment, the dot overlap rate in the medium-density areas where density unevenness is taken into consideration the most is made to be higher than in other density areas (low-density areas, high-density areas). The calculation method and control method for the dot overlap rate as described above are the same even in the case where index patterns K1' to KM' are prepared for M-pass printing. These kinds of index patterns can be prepared for each image characteristic. By doing so, it is possible to adjust the dot overlap rate according to the image characteristic by index expansion processing.

According to the present embodiment as explained above, density data are generated for M planes that correspond to a multipass number (M), after which the density data for M planes are quantized to multi values. In addition, the M pieces of multi-value quantized data undergo binarization processing using an index pattern such that dot overlap rates are achieved to correspond to respective image characteristics. By doing so, the dot overlap rate in the plain paper "fine" mode where density shortage is taken into consideration can be made to be lower than that in the inkjet dedicated paper "standard mode". In other words, by making the dot overlap rate different between the printing mode in which density unevenness stands out more than graininess or density shortage and a printing mode in which the graininess or density shortage is taken into consideration more than the density unevenness, it is possible to output high-quality images regardless of the printing mode.

Other Embodiments

In the above embodiments, a plurality of multi-value image data that corresponds to a plurality of relative scans is generated based on inputted image data. However, the inputted image data may be divided into a plurality of multi-value data that corresponds to a plurality of printing nozzle arrays, and between the scans, mask division processing may be applied.

Moreover, in the printing head of the first to third embodiments, two nozzle arrays are provided for discharging ink of the same color; however, it is also possible for the number of nozzle arrays for discharging ink of the same color to be N (N is an integer 1 or greater) such as 1, 4 or 8. In the case of performing M-pass printing with N nozzle arrays, first, M groups of multi-value density data that correspond to M relative movements are generated from the inputted image data (RGB). Then, these M groups of multi-value density data are respectively quantized to generate M groups of quantized data that correspond to the M relative movements. After that, when N is 1, data division is not performed using a mask, and an image is printed in the same area by one nozzle array during the M relative movements. On the other hand, when N is 2 or more, the M groups of quantized data that correspond to the above M relative movements are divided into N divisions by N masks having a complementary relationship with each other, and thereby quantized data for the M relative movements that correspond to the N nozzle arrays are generated. Then, an image is printed in the same area during the M relative movements by the N nozzle arrays. Even when such a combination of N and M differs for each image characteristic, by employing or combining the embodiments described above, it is possible to achieve a dot overlap rate suitable for each printing mode.

In addition, in the above, in the case of the M-pass printing, generating the M groups of multi-value density data (M sets of CMYK data) that correspond to the M relative movements from the inputted image data (RGB) was explained; however, the present invention is not limited to this. In a 3-pass or greater M-pass printing mode, it is not essential to generate the M groups of density data, but there can be a configuration in which P groups (P is an integer 2 or greater) of density data are generated where P is less than M. In such a case, first, P groups of image data are generated where P is less than M, and then the P groups of density data are quantized to obtain P groups of quantized data. After that, M groups of quantized data for M passes are obtained by dividing at least one group of the P groups of quantized data. When doing this, the effect of the present invention can be obtained by preparing distribution rates, which are used when generating the P pieces of density data, or threshold value tables, which are used when quantizing the P pieces of density data such that a dot overlap rate suitable for image characteristics can be obtained.

Further, the multipass printing method described above can be applied to a full-line type print apparatus that is provided with a number of printing elements that correspond to the width of the printing medium with N printing heads that discharge the same amount of the same color of ink being arranged in the conveying direction of the printing medium. In this case, image data can be divided into image data to be printed by the above N printing heads that discharge the same kind of ink, and the divided image data can be printed by each of the N printing heads while the printing medium is being conveyed (during relative movement). As a result, even though fluctuation may occur in discharge characteristics among the respective printing elements, it is possible to reduce the effect of that fluctuation among the N printing elements. Moreover, even though fluctuation in head arrangement or discharge speed exists among the N printing heads, density unevenness or graininess that occurs due to deviation of dot groups that are printed by the respective printing heads, or in other words, deviation between planes, can be controlled by the same action as in the embodiments described above.

That is, in the present invention, first density data that correspond to at least one relative movement and second density data that correspond to at least one other relative movement can be generated from inputted image data. In addition, it is clear that the M-pass data generation processing explained here can be applied to N printing element group data generation processing, as explained above. In other words, even in the case of using the N printing element groups that discharge ink of the same color, it is possible to generate P groups of density data where P is less than N, or it is also possible to generate N groups of density data.

In the embodiments described above, an image processor that performs the characteristic image processing of the present invention was explained using as an example the print apparatus provided with the control unit 3000 having an image processing function, however; the present invention is not limited to this kind of construction. The characteristic image processing of the present invention may also be performed by a host device (for example, the PC 3010 in FIG. 2) installed with a printer driver. In this case, the host device corresponds to the image processor of the present invention.

The present invention is realized even by a program code that constitutes a computer readable program for realizing the above described image processing functions, or by a storage medium that stores the program code. In this case, a host device, of a computer (or a CPU or MPU) of an image forming device reads and performs the above program code, and thereby the above-described image processing is realized. As described, the computer readable program for instructing a computer to perform the above-described image processing, or the storage medium that stores the program, is also included in the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-265346, filed Nov. 20, 2009, which is hereby incorporated by reference herein in its entirety.

What is claimed is:

1. An image processor for processing input image data that represents a density of an image to be printed on a unit area which corresponds to a plurality of dots on a printing medium in order to perform printing in the unit area by a plurality of relative movements, including a first relative movement and a second relative movement which is different from the first relative movement, between a printing unit configured to print the dots and the printing medium, the image processor comprising:

a setting unit configured to set a printing mode that is selected from a plurality of printing modes including a first printing mode and a second printing mode having a larger number of the relative movements than the first printing mode; and an image processing unit configured to, according to the printing mode set by the setting unit, generate first and second multi-valued density data each corresponding to the first and second relative movements from the input image data respectively, and quantize each of the first and second multi-valued density data to generate first and second quantized data for printing the dots corresponding to each of the first and second relative movements, wherein the image processing unit generates the first and second quantized data such that in a case that the density represented by the input image data is an intermediate density, a ratio in the first printing mode is higher than the ratio in the second printing mode, the ratio being a ratio of a number of dots that are printed to overlap in the unit area by both of the first and second relative movements on the basis of the first and second quantized data with respect to the total number of dots that are to be printed in the unit area by the first and second relative movements on the basis of the first and second quantized data.

2. The image processor according to claim 1, wherein the image processing unit, at least in the case that the density represented by the input image data is the intermediate density, generates the first and second multi-valued density data such that a difference between a ratio of value of the first multi-valued density data to value of the input image data and a ratio of value of the second multi-valued density data to value of the input image data in the second printing mode is smaller than the difference in the first printing mode.

3. The image processor according to claim 1, wherein the image processing unit quantizes the second multi-valued density data on the basis of the first multi-valued density data and quantizes the first multi-valued density data on the basis of the second multi-valued density data.

4. The image processor according to claim 3, wherein the image processing unit determines, on the basis of the second multi-valued density data, a first threshold value used for performing error-diffusion processing of the first multi-valued density data; quantizes the first multi-valued density data by performing the error-diffusion processing of the first multi-valued density data on the basis of the first threshold value; and also determines, on the basis of the first multi-valued density data, a second threshold value used for performing error-diffusion processing of the second multi-valued density data; and quantizes the second multi-valued data by performing the error-diffusion processing of the second multi-valued density data on the basis of the second threshold value.

5. The image processor according to claim 1, wherein the first and second quantized data are L-value (L is an integer equal to or greater than 3) quantized data respectively and the image processing unit converts each of the first and second quantized data to first and second binary data by dot patterns.

6. The image processor according to claim 1, wherein the image processing unit generates the first and second multi-valued density data such that a difference between a ratio of value of the first multi-valued density data to value of the input image data and a ratio of value of the second multi-valued density data to value of the input image data in a case that the density represented by the input image data is a first density is smaller than both of the difference in a case that the density represented by the input image data is a second density which is lower than the first density and the difference in a case that the density represented by the input image data is a third density which is higher than the first density, in both of the first and second printing mode.

7. An image processor for processing input image data that represents a density of an image to be printed on a unit area which corresponds to a plurality of dots on a printing medium in order to perform printing in the unit area by a plurality of relative movements, including a first relative movement and a second relative movement which is different from the first relative movement, between a printing unit configured to print the dots and the printing medium, the image processor comprising:

a setting unit configured to set a printing mode that is selected from a plurality of printing modes including a first printing mode for performing printing on a first type of printing medium and a second printing mode for performing printing on a printing medium having lower ink absorbability than the first type of printing medium; and an image processing unit configured to, according to the printing mode set by the setting unit, generate first and second multi-valued density data each corresponding to the first and second relative movements from the input image data respectively, and quantize each of the first and second multi-valued density data to generate first and second quantized data for printing the dots corresponding to each of the first and second relative movements, wherein the image processing unit generates the first and second quantized data such that in a case that the density represented by the input image data is an intermediate density, a ratio in the first printing mode is higher than the ratio in the second printing mode, the ratio being a ratio of a number of dots that are printed to overlap in the unit area by both of the first and second relative movements on the basis of the first and second quantized data with respect to the total number of dots that are to be printed in the unit area by the first and second relative movements on the basis of the first and second quantized data.

8. The image processor according to claim 7, wherein the first type of printing medium is inkjet dedicated paper, and the second type of printing medium is plain paper.

9. An image processor for processing input image data that represents a density of an image to be printed on a unit area which corresponds to a plurality of dots on a printing medium in order to perform printing in the unit area by relative movements between a plurality of printing element groups, including a first printing element group and a second printing element group which is different from the first printing element group, for printing dots of the same color and the printing medium, the image processor comprising:

a setting unit configured to set a printing mode that is selected from a plurality of printing modes including a first printing mode and a second printing mode having a larger number of the relative movements than the first printing mode; and an image processing unit configured to, according to the printing mode set by the setting unit, generate first and second multi-valued density data each corresponding to the first and second printing element groups from the input image data respectively, and quantize each of the first and second multi-valued density data to generate first and second quantized data for printing the dots corresponding to each of the first and second printing element groups, wherein the image processing unit generates the first and second quantized data such that in a case that the density represented by the input image data is an intermediate density, the ratio in the first printing mode is higher than the ratio in the second printing mode, the ratio being the ratio of a number of dots that are printed to overlap in the unit area by both of the first and second printing element groups on the basis of the first and second quantized data with respect to the total number of dots that are to be printed in the unit area by the first and second printing element groups on the basis of the first and second quantized data.

10. The image processor according to claim 9, wherein the image processing unit, at least in the case that the density represented by the input image data is the intermediate density, generates the first and second multi-valued density data such that a difference between a ratio of value of the first multi-valued density data to value of the input image data and a ratio of value of the second multi-valued density data to value of the input image data in the second printing mode is smaller than the difference in the first printing mode.

11. The image processor according to claim 9, wherein the image processing unit generates the first and second multi-valued density data such that a difference between a ratio of value of the first multi-valued density data to value of the input image data and a ratio of value of the second multi-valued density data to value of the input image data in a case that the density represented by the input image data is a first density is smaller than both of the difference in a case that the density represented by the input image data is a second density which is lower than the first density and the difference in a case that the density represented by the input image data is a third density which is higher than the first density, in both of the first and second printing mode.

12. The image processor according to claim 9, wherein the image processing unit quantizes the second multi-valued density data on the basis of the first multi-valued density data, and quantizes the first multi-valued density data on the basis of the second multi-valued density data.

13. The image processor according to claim 12, wherein the image processing unit determines, on the basis of the second multi-valued density data, a first threshold value used for performing error-diffusion processing of the first multi-valued density data; quantizes the first multi-valued data by performing the error-diffusion processing of the first multi-valued density data on the basis of the first threshold value; and also determines, on the basis of the first multi-valued density data, a second threshold value used for performing error-diffusion processing of the second multi-valued density data; and quantizes the second multi-valued data by performing the error-diffusion processing of the second multi-valued density data on the basis of the second threshold value.

14. The image processor according to claim 9, wherein the first and second quantized data are L-value (L is an integer equal to or greater than 3) quantized data respectively; and the image processing unit converts each of the first and second quantized data to first and second binary data by dot patterns.

15. An image processing method for processing input image data that represents a density of an image to be printed on a unit area which corresponds to a plurality of dots on a printing medium in order to perform printing in the unit area by a plurality of relative movements, including a first relative movement and a second relative movement which is different from the first relative movement, between a printing unit configured to print the dots and the printing medium, the image processor comprising:

a setting step for setting a printing mode that is selected from a plurality of printing modes including a first printing mode and a second printing mode having a larger number of the relative movements than the first printing mode; and an image processing step for, according to the printing mode set by the setting step, generating first and second multi-valued density data each corresponding to the first and second relative movements from the input image data respectively, and quantizing each of the first and second multi-valued density data to generate first and second quantized data for printing the dots corresponding to each of the first and second relative movements, wherein the image processing step generates the first and second quantized data such that in a case that the density represented by the input image data is an intermediate density, a ratio in the first printing mode is higher than the ratio in the second printing mode, the ratio being a ratio of a number of dots that are printed to overlap in the unit area by both of the first and second relative movements on the basis of the first and second quantized data with respect to the total number of dots that are to be printed in the unit area by the first and second relative movements on the basis of the first and second quantized data.

16. The image processing method according to claim 15, wherein the image processing step, at least in the case that the density represented by the input image data is the intermediate density, generates the first and second multi-valued density data such that a difference between a ratio of value of the first multi-valued density data to value of the input image data and a ratio of value of the second multi-valued density data to value of the input image data in the second printing mode is smaller than the difference in the first printing mode.

17. The image processing method according to claim 15, wherein the image processing step generates the first and second multi-valued density data such that a difference between a ratio of value of the first multi-valued density data to value of the input image data and a ratio of value of the second multi-valued density data to value of the input image data in a case that the density represented by the input image data is a first density is smaller than both of the difference in a case that the density represented by the input image data is a second density which is lower than the first density and the difference in a case that the density represented by the input image data is a third density which is higher than the first density, in both of the first and second printing mode.

18. The image processing method according to claim 15, wherein the image processing step quantizes the second multi-valued density data on the basis of the first multi-valued density data and quantizes the first multi-valued density data on the basis of the second multi-valued density data.

19. The image processor according to claim 18, wherein the image processing step determines, on the basis of the second multi-valued density data, a first threshold value used for performing error-diffusion processing of the first multi-valued density data; quantizes the first multi-valued data by performing the error-diffusion processing of the first multi-valued density data on the basis of the first threshold value; and also determines, on the basis of the first multi-valued density data, a second threshold value used for performing error-diffusion processing of the second multi-valued density data; and quantizes the second multi-valued data by performing the error-diffusion processing of the second multi-valued density data on the basis of the second threshold value.

20. An image processing method for processing input image data that represents a density of an image to be printed on a unit area which corresponds to a plurality of dots on a printing medium in order to perform printing in the unit area by relative movements between a plurality of printing element groups, including a first printing element group and a second printing element group which is different from the first printing element group, for printing dots of the same color and the printing medium, the image processing method comprising:

a setting step for setting a printing mode that is selected from a plurality of printing modes including a first printing mode and a second printing mode having a larger number of the relative movements than the first printing mode; and an image processing step for, according to the printing mode set by the setting step, generating first and second multi-valued density data each corresponding to the first and second printing element groups from the input image data respectively, and quantizing each of the first and second multi-valued density data to generate first and second quantized data for printing the dots corresponding to each of the first and second printing element groups, wherein the image processing step generates the first and second quantized data such that in a case that the density represented by the input image data is an intermediate density, the ratio in the first printing mode is higher than the ratio in the second printing mode, the ratio being the ratio of a number of dots that are printed to overlap in the unit area by the both of the first and second printing element groups on the basis of the first and second quantized data with respect to the total number of dots that are to be printed in the unit area by the first and second printing element groups on the basis of the first and second quantized data.

* * * * *